(12) United States Patent
Pedersen

(10) Patent No.: US 11,910,802 B2
(45) Date of Patent: Feb. 27, 2024

(54) PROCESS EQUIPMENT FOR STERILIZING NON TRANSPARENT FLUIDS AND A METHOD FOR THIS

(71) Applicant: Calvex A/S, Højslev (DK)

(72) Inventor: Brian Pedersen, Skive (DK)

(73) Assignee: Calvex A/S, Højslev (DK)

( * ) Notice: Subject to any disclaimer, the term of this patent is extended or adjusted under 35 U.S.C. 154(b) by 711 days.

(21) Appl. No.: 16/756,441

(22) PCT Filed: Oct. 12, 2018

(86) PCT No.: PCT/DK2018/050253
§ 371 (c)(1),
(2) Date: Apr. 15, 2020

(87) PCT Pub. No.: WO2019/076413
PCT Pub. Date: Apr. 25, 2019

(65) Prior Publication Data
US 2020/0323226 A1 Oct. 15, 2020

(30) Foreign Application Priority Data

Oct. 16, 2017 (DK) .............................. PA201770781
Apr. 20, 2018 (DK) .............................. PA201870236

(51) Int. Cl.
*A23C 3/07* (2006.01)
*A23C 3/033* (2006.01)
(Continued)

(52) U.S. Cl.
CPC ............ *A23C 3/076* (2013.01); *A23C 3/0335* (2013.01); *A23C 3/073* (2013.01); *A23C 7/04* (2013.01);
(Continued)

(58) Field of Classification Search
CPC .......... A23C 3/076; A23C 3/0335; A23C 7/04
See application file for complete search history.

(56) References Cited

U.S. PATENT DOCUMENTS 3,926,556 A 12/1975 Boucher
2004/0005242 A1 1/2004 Koulik et al.
2008/0305018 A1 12/2008 Blum

FOREIGN PATENT DOCUMENTS

EP 2572592 A1 3/2013
WO WO 2012/044264 A1 4/2012
(Continued)

OTHER PUBLICATIONS

Cappato, et al., "Ohmic heating in dairy processing: Relevant aspects for safety and quality", Trends in Food Science & Technology, Feb. 2017, vol. 62, pp. 104-112 See entire document.
(Continued)

*Primary Examiner* — Kevin Joyner
(74) *Attorney, Agent, or Firm* — Knobbe, Martens, Olson & Bear, LLP

(57) ABSTRACT

A device and a method are for sterilization of milk from livestock such as cows, sheep or goats. The milk, prior to an irradiation with UV-C light through a light translucent barrier, is homogenized since the milk is exposed to ultrasound. The milk simultaneously to or after the homogenization is exposed to an electrical field, such as a field with changing polarity, where polarity change and field strength are chosen such that the milk in the electrical field is heated due to the milk's resistance.

27 Claims, 15 Drawing Sheets

(51) Int. Cl.
    *A23C 7/04*     (2006.01)
    *A23L 3/005*     (2006.01)
    *A23L 3/28*     (2006.01)
    *A23L 3/30*     (2006.01)

(52) U.S. Cl.
    CPC ............... *A23L 3/005* (2013.01); *A23L 3/28* (2013.01); *A23L 3/30* (2013.01); *A23V 2002/00* (2013.01)

(56) References Cited

FOREIGN PATENT DOCUMENTS

| WO | WO 2016/110828 A2 | 7/2016 |
|---|---|---|
| WO | WO 2016/110829 A1 | 7/2016 |

OTHER PUBLICATIONS

Christen et al., "Ultraviolet-C Irradiation: A Novel Pasteurization Method for Donor Human Milk", PLOS ONE, 2013, vol. 8, No. 6, pp. 1-7.

Engin et al., "Effects of ultraviolet light and ultrasound on microbial quality and aroma-active components of milk", Journal of the Science of Food and Agriculture, 2011, vol. 92, pp. 1245-1552.

Halpin et al., "Combined treatment with mild heat, manothermosonication and pulsed electric fields reduces micrbial growth in milk", Food Control, 2013, vol. 34, pp. 364-371.

Office Action issued in DK application No. PA 2018 70236, dated Jun. 28, 2018.

Search Report issued in International application No. PCT/DK2018/050253, dated Nov. 1, 2019.

Supplementary European Search Report issued in Application No. EP 18867512, dated Jun. 17, 2021.

Paniwnyk, L. "Applications of ultrasound in processing of liquid foods: A review", Ultrasonics Sonochemistry, 38: 794-806 (2016).

Sengul et al., "Effect of photosonication treatment on inactivation of total and coliform bacteria in milk", Food Control, 22(11): 1803-1806 (2011).

Flow pattern at 200 ml/min

Flow pattern at 1000 ml/min.

PROCESS EQUIPMENT FOR STERILIZING NON TRANSPARENT FLUIDS AND A METHOD FOR THIS

BACKGROUND OF THE INVENTION

Field of the Invention

The invention relates to process equipment and method for sterilization of non transparent liquids such as milk.

Description of the Related Art

In this application is used the word sterilization regarding the, in this description patent applied, efficient treatment for reduction of bacteria growth in non-transparent liquids. A reduction, by which the remaining number of surviving bacteria is 0. Where there are few surviving bacteria, these are seen as artefacts, which blur the image of how efficient the invention's method is. It is thus thought to be able to replace sterilizations, which impairs for example raw milk's content of antibodies.

A device, according to the invention, is designed with a view to render harmless bacteria in raw milk, while another, according to the invention, is designed with a view to render harmless bacteria in tank milk. Both devices use the invention's method, which ensures minimal destruction of important ingredients and minimal effect on the molecular structure. By both devices, the used method will ensure that the milk and/or the raw milk gets as gentle and efficient a treatment as possible.

The viscosity of raw milk varies a lot from strip milking to strip milking, from animal to animal, and from herd to herd. That means that there is made some wholly different demands for equipment, which must treat raw milk, than to equipment, which must treat ordinary tank milk. Therefore, there is for example required thicker hoses and optionally higher pressure in order to lead the raw milk through a treatment facility.

Raw milk, also called colostrum, defined as the milk the cow produces up to 72 hours after calving, cannot be delivered to the dairy and is therefore in principle worthless for the milk producer. The calf most often drinks 4 liters out of the number of liters the cow produces in this period. The very first milk contains more than 250 proteins, including antibodies, all with the purpose—from nature's side—to strengthen the calf against disease and ensure the physiological development and growth. In the first hours after the calf is born, the calf ingests the antibodies from the bowel to the bloodstream, where they constitute an important part of the immune system, until the calf is, by itself, is capable of producing antibodies. Over the course of few days after calving, the milk's composition changes to the milk, we humans typically use.

Scientific tests carried out through the last decades in labs and universities all over the world have shown that immune and growth factors in cows' raw milk are identical with the corresponding ingredients in breast milk from humans. However, the cow's raw milk is 40 times richer in antibodies than the human's. This means that the good characteristics in cows' raw milk can have an effective effect on humans both externally and internally. Many companies have specialized in manufacturing the best products for internal use, and others have begun to use the raw milk for cosmetic products. The raw milk's good characteristics have shown themselves directly to be able to be used by humans and thereby strengthen our stomach-intestinal system and the skin's surface.

Everywhere in the following application, the term "milk" will thus be used as collective name for milk and colostrum, treated or untreated. The terms "raw milk" or "colostrum" are used for the special milk, which the mother animal has produced in the time span up to, and 72 hours after calving. If it should be emphasized that the mentioned milk does not contain colostrum, the term "tank milk" is used, since this is the milked out milk, which is headed towards, or stored in, a tank at the factory, until it becomes collected, with a view to delivery to a dairy.

Milk is a good nutrient medium for microorganisms, and bacteria can therefore quickly multiply under the right conditions. A high number of bacteria in the milk reduces the nutritional quality of the milk and increases the risk of diseases. Different technologies are used to prevent a high concentration of microorganisms in milk. Pasteurization is a process, which reduces the number of microorganisms, whereas sterilization is a process, which eliminates all microorganisms in the milk. There is used three technologies for pasteurization:

1. Low temperature/long time (LTLT) heating of milk to 60-63 degrees Celsius in 30-60 min.
2. High temperature/short time (HTST), heating of milk to 72 degrees Celsius in 15 s.
3. Moreover, Ultra High Treatment (UHT) is used for sterilization of milk, where the milk is heated to temperatures >130 degrees Celsius in 2-10 s.

The drawbacks of these known methods are respectively:
1. Uses a lot of energy (power and water) and time.
2. Heating of colostrum will reduce the amount of antibodies, and since these materials are very important for the calves' accumulation of a good immunity and ensure a high milk output later, this is a large drawback.
3. UHT causes molecular changes in the milk, which changes the taste/the aroma and thereby impairs the sales value for consumption.

Known technique for sterilization includes several previous patent documents.

US2008/0305018 describes a system for irradiating a liquid with UV light.

The system includes a UV tube surrounded by a circular quartz glass cover. Around this is wrapped a translucent tube, through which the fluid is led. The wrapping is shown as a spiral angle. In column 1, section 0005, is mentioned milk as one of several examples of liquids that can undergo treatment with the system. The result is a sterilization that degrades the molecular structure in all DNA. This causes pathogens to break down. Experimental results are not shown.

WO2016/110828 describes a system for treatment of milk with UV light, where two spiral wound hoses are placed outside each other with centrally placed, and a between two spiral windings placed, light sources for ensuring achievement of irradiation of all parts of the milk. In the document, there is also an explanation of which flow technical conditions that must be met in order to achieve replacement of milk parts inside the spiral winding. A closely wound spiral is shown in FIG. 7B. There are no experimental sterilization data.

WO 2012/044264 describes a sterilization by use of UV light of opaque (non-transparent), translucent (diaphanous) and/or transparent (see-through) liquid shaped, drinkable foodstuff products at a lower temperature than the technique, which has been used for UV irradiation of for example milk.

It consists, in the application, of pipes with flow obstacles for ensuring turbulent flow. It is stated that such pipes or hoses can be spirally wound around a UV source in order to provide all milk parts with equal light. There are no experimental sterilization data.

U.S. Pat. No. 3,926,556 describes various methods for ensuring even and uniform irradiation of various parts of a liquid. Here, it is the case of irradiation with both UV light and microwaves at two frequencies, 2450 and 915 MHz. The use of a spiral wound hose around a light source is shown in FIG. 2. Destruction of microorganisms in milk is mentioned, and in Table III is shown numbers for the effect of treatment with the irradiation techniques separately and the techniques combined on the germ number in the milk. It is seen that the germ number is very low by the combination.

SUMMARY OF THE INVENTION

It has been found that one by the present invention ensures a sterilization without the milk becoming exposed to very high temperatures. Hereby, the liquid's content of proteins and antibodies is kept intact. Also, the energy consumption per kg treated milk is a lot smaller by use of the technique according to the invention.

The invention thus relates to a device, according to claim 1, for sterilizing a non-transparent liquid, e.g. milk, which includes that the non-transparent liquid, which is here tank milk or colostrum from, for example, cows, goats or sheep, is UV-C treated, since the milk is previously homogenized, by use of ultrasound using at least one transducer and is exposed to current through the fluid using ohmic heating. A preferred embodiment, as in claim 2, is where ultrasonic treatment occurs before or simultaneously with ohmic heating, and these two treatments prior to UV-C irradiation in a treatment tub separate from the tempering tub. Maintenance of a particular temperature of the liquid, as in claim 3 can if needed occur by the liquid preferentially simultaneously or hereafter being warmed or exposed to ohmic heating under maintenance of a suiting, but not too high temperature.

A preferred embodiment is as in claim 4, where ohmic heating is carried out by inflicting a potential difference over the liquid, for hereby to send current through it.

Another preferred embodiment is where the UV-C light, as in claim 5, has a wavelength, which is placed within the interval 222 nm to 282 nm, preferably within the interval 253 nm-254 nm.

The liquid is led, by the UV-C treatment, according to claim 6, preferably past a light translucent barrier with a first surface, along which the milk flows, and since there, by the other surface of the light translucent barrier is provided a light source, which emits light with a predetermined wavelength.

The light source can be surrounded by a light translucent sleeve such as the glass pipe in a fluorescent tube or the glass, which encloses the filament in a filament lamp. There can also be used other light producing techniques surrounded by a protective glass sleeve. Together, such a setup is called a light source.

Hereby, the liquid, which is placed by the light translucent barrier, will be exposed to the light from the light source, since this permeates the light translucent barrier and possible damage causing microorganisms in this liquid will become damaged and subsequently no longer be able to function or multiply themselves.

The wavelength is chosen such that the damage effect on the microorganisms is highest and here, it has been found that a wavelength of about 254 nm is most damaging for the microorganisms.

The light translucent barrier includes a hose with an internal bore and an internal surface, along which the liquid flows and an external surface, where the device also includes a pump, which is designed to send the liquid from a treatment tub further through the hose's internal clearing with a certain flow speed.

This part of the system is termed a reactor. In the following is used milk as an example for a non-transparent liquid, but the device's shape and subsequent method used on milk is in the same way suited for other non-transparent liquids.

In the reactor, the milk is pressed through hoses by use of a pressure between 4-17 bar, where there is simultaneously illuminated with the mentioned UV-C light from all sides for optimum illumination of the milk. This combination of flow through a light translucent hose, pressure and light provides an effective damage effect on the bacteria in the milk.

The hose is in a suitable design wrapped in spiral formation around a light source, such that the hose's continuous curvature along with the flow speed, which the pump imparts the milk through the hose, ensures a flow through the hose, whereby milk parts near the inner surface of the hose are continually replaced with milk parts closer to the hose's center line.

For the purpose is thus used an elongated light source, which spreads the light evenly in all radial directions away from a center line. Multiple light sources can be used with each own hose winding, and between these there are suitably placed light sources without hose winding. Thus, each individual winding gets both irradiation from the center, through which the winding proceeds and externally, such that the hose is illuminated approximately uniformly along its entire external surface. The continuous curvature of the hose helps to ensure that the milk at the inner surface of the hose is constantly replaced with milk parts at the hose's center, since the flow in the hose is hereby imparted a flow component across the pressure drop direction from the pump towards the outlet of the hose. It is thereby ensured that all milk parts are irradiated evenly at the passage through the hose, which contributes to that as many possible of the microorganisms are exposed to the light's damaging effect.

The hose appropriately consists of polytetrafluoroethylene (PTFE), which is a synthetic fluoropolymer of tetrafluoroethylene, or fluoride substituted ethylene propylene (FEP). The hose also has a circular cross section. The hose's length and cross sectional area are related such that the larger cross sectional area, the larger the hose must proceed in the illuminated area in order to ensure that all milk parts are illuminated sufficiently.

Appropriately, there is also, according to the invention, designed a set of electrically conducting electrodes for application of the milk between the electrodes a predetermined average electrical current density through a potential difference between the electrodes.

The advantage of this is the increased efficiency since one through heating via ohmic heating can heat directly on the milk and thus also get the most yield from the supplied effect. This is to be seen in relation to prior art techniques where there is, for example, used heat exchangers or hot steam for heating, whereby singeings and coatings on heat exchanger surfaces are difficult to avoid.

It is also advantageous if the electrodes are designed as surface electrodes or grid electrodes. Especially grid electrodes provide possibility for the milk to be able to easily circulate in and out of the space between the electrodes.

In the system for ohmic heating, the electrodes are thus connected to a voltage source, designed to apply the electrodes either a varying and changing voltage difference or an even voltage difference. It is preferred to use a shifting and varying voltage difference, e.g., a common alternating voltage, which is relatively easy to generate from the power in the mains, such that there is for example, obtained a harmonic voltage variation with a suitable high voltage difference between the electrodes and a suitable frequency. The frequency will then most easily correspond to the frequency of the grid, which in Denmark is 50 Hz, but also in countries with frequencies and voltage levels varying from this, the design can work with little or no modifications.

Frequency and voltage difference must be adapted to the chosen electrode set's physical design and the distance between the electrodes, such that the distance between the electrodes and the milk's conductivity at the selected medium voltage and frequency will ensure a controlled heating of the milk without the occurrence of electrical discharges or examples of bump boiling, which can be destructive to the milk's content of beneficial antibodies and other protein compounds. Other types of voltage differences between the electrodes are possible, but it is essential that there is maintained a mean power density in the liquid between the electrodes over a certain period of time for ensuring a temperature rise in the fluid.

Ohmic heating is thereby a way whereupon one heats the liquid by exposing the liquid for the direct effect of an electrical current through supply of voltage to electrodes dipped in the liquid, such that one uses the liquid as heating element, where the liquid's conductivity is used. The advantage is that one can here stress the bacteria by them both getting power, which stresses the microorganisms and heat. That is the two most important causes for use of this technology are heat and stress. The stress could be that the microorganisms' DNA cannot stand too much heat over long time. The DNA will denature and the microorganisms will die.

There is typically used two electrodes. Systems with several electrodes can however easily be set up.

It is preferred that the power is AC meaning Alternating Current or in Danish vekselstrøm.

It is noted that direct current (DC: direct current) can be used for this purpose, but it requires another type of electrode, and the results in relation to damage effect towards bacteria are less well documented. It is therefore preferred to use AC.

It is further prescribed that one or more ultrasonic transducers are connected to the process equipment, which is designed to apply the milk an ultrasonic field with a predetermined field strength and frequency composition for ensuring the separation of clumped cells, protein and fat portions of the milk. It is hereby ensured that the milk becomes homogenized. It is important that the homogenization is carried out prior to the irradiation with UV light and heating, since there otherwise can occur agglomerates or clumped milk fat or milk proteins, in whose centers microorganisms can be present. These hereby become not properly heated, nor are they exposed to the light effect. It is thus preferred that the device has a tub in which the electrodes for ohmic heating are placed at the bottom, since there is also added ultrasound to the tub through the same bottom. The ultrasonic transducers can thus conveniently be located under the bottom of the tub with primary working area upwards through the bottom of the tub and into the milk here. It allows for simultaneous exposure to ohmic heating and ultrasonic field. Ultrasound can of course also be led into the milk from the sides, or via immersed ultrasound transducers. It should further be noted that lattice electrodes for ohmic heating, placed with their extension plane parallel to the bottom of the tub, will allow the ultrasound to pass through the many openings, which the lattice defines.

By the homogenization, it occurs that the larger protein lumps in the milk become uniform, and this is important when the variation of the size of the lumps is as large as in the case of milk and raw milk/colostrum from cows, goats, sheep and other domestic animals. The larger these lumps are, the more difficult it is for the heat to penetrate into the areas where these bacteria lie. The treatment is easy and simple. In addition, the ultrasound stresses the bacteria, in aggregate, which strengthens the sterilization method, which is here the process of ultrasonic treatment combined with ohmic heating.

The invention thus also relates to a method for sterilizing milk from domestic animals. The milk can come from any domestic animal that is milked for food production, medicine production, production of animal feed or production of cosmetic products. The milk can also, after the treatment, according to the method, be treated further to more specialized technical products, such as paint, casein or other technical products, which are used in industry or household.

By the method, the milk is exposed to ultrasound prior to a possible irradiation with UV-C light, since the milk simultaneously or after the homogenization is exposed to an electric field, preferably a field with changing polarity, where polarity shift and field strength are selected such that the milk in the electrical field is heated due to the milk's resistance.

By the ultrasound effect, it is ensured that agglomerates in the milk dissolve and the milk thereby becomes more uniform and lumps of fats in the milk can then not function as places in which microorganisms are protected from the effect of the subsequent irradiation. The power effect of the milk will on the one hand raise the temperature and, on the other hand, have a more directly harmful effect on microorganisms.

The method further includes that the milk, during the treatment, is heated or cooled to a predetermined temperature range for ensuring optimum sterilization and to ensure that the proteins of the milk are not degraded. Due to treatment with ultrasound, ohmic heating and light, a temperature range, can be chosen, which is lower than what is otherwise prescribed to effectively destroy a significant part of the microorganisms, which can be in the milk.

By the method, the milk is led through a treatment tub. Here it is exposed to power effect and hence consequent resistance heating and to ultrasound, as the milk via a pump is sent from the tub further through a transparent tube wrapped in spiral shape around a light source.

Here, the milk is exposed to an irradiation with light through the light translucent barrier, since the milk is brought to flow along the barrier.

By the method is thus ensured a milk which is mostly free of viable microorganisms and whose durability is thereby greatly improved. The milk can thus, for example, just like that after ended treatment, be frozen for later use. This is particularly important when the method is applied to colostrum, since it allows for distributing milk from maternal animals with a particularly high antibody concentration in the milk, to a larger number of newborns and not just the mother animal's own offspring. Especially when the newborn animals are born at varying times throughout the year, the importance of freezing and thawing colostrum without the emergence of microorganisms is significant. However, the method is also applicable in connection with ordinary liquid milk, where this after ended treatment is sent for cooling in the factory's tank station, and here as well as afterwards in a dairy, can better be stored without significant growth of microorganisms.

After the irradiation with UV-C light, the milk is passed through a metal tube, since the two tubes are immersed in a tempering tub, in which a constant temperature is maintained. Hereby is ensured an effective combination of the effects of ultrasound, heating with electric current, light exposure with UV-C light and heating to a temperature range. According to the requirements for durability and protection of the milk's proteins and antibodies, the temperature range in the last step, as well as the effects of the other influences, can be determined.

According to the method, the milk is sent back to the tub after the treatment with light and after flow through in the metal tube. From here, the milk can now be sent to another form of treatment or storage. This embodiment of the method is particularly suitable for collection and treatment of colostrum, and the, for the method belonging device, is therefore appropriately mobile, such that it can for example be brought along out to the milking place, where for example a cow, has recently calved.

It is, however, relatively easy to insert the device, for execution of the method, in a milking device, such that all milk is sent through the device in connection with the milking and prior to the milk being sent to the factory's tank facility.

The invention also relates to an application of the device as described above, where the milk is supplied to the device directly after the milking and where the milk, after the treatment, is sent along to receiving unit such as storage tank or transport vehicle or for feed use for offspring after the milked animals. By such an application, offspring after maternal animals, for one reason or another cannot supply the offspring colostrum, receiving colostrum is ensured from another mother animal. In addition, any milk that flows through the device can be stored better without losing its quality thereby.

The method is far more gentle and faster than the traditional methods, and here it is considered that the spiral reactor has the greatest effect on the milk. It should be noted that bacteria and antibodies in the milk are both made up of proteins, and therefore it is difficult with heat impact of the milk to destroy bacteria without damaging the antibodies. By combining the mentioned various effects: ultrasound and ohmic heating and subsequent irradiation, it has been achieved to find a path out of the dilemma, such that bacterial culture in the milk is damaged so much that multiplication is no longer possible, while the antibodies do not significantly change structure or are otherwise rendered inactive.

BRIEF DESCRIPTION OF THE DRAWINGS

The invention will now be explained more fully with reference to the drawings, on which.

DETAILED DESCRIPTION OF THE PREFERRED EMBODIMENT

Figure 1:
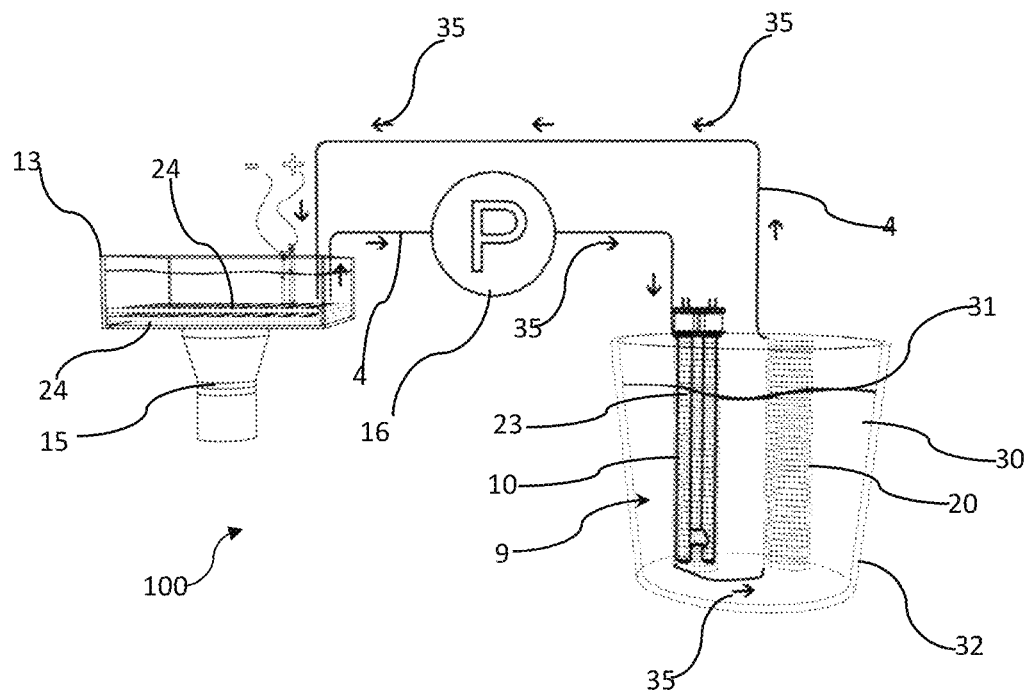
FIG. 1 shows, in schematic form, the milk's passage through the device 100 with return flow to the treatment tub 13.

FIG. 1 is seen in schematic form a device 100 according to the invention, with a treatment tub 13 for both resistance heating and ultrasonic treatment. The treatment tub 13 is via hoses 4 and a pump 16 connected to a so-called reactor 9, where the milk is exposed to further effect in the form of UV light irradiation and at the same time subjected to a predetermined thermal effect.

In a specific case, the treatment tub is dimensioned to 150 mm*150 mm*60 mm. Tub, which is even smaller, has hardly any practical use in dairy herds. The reactor 9 includes an elongated light source 23 around which a transparent polymer tube 4 is wound in spiral shape 10. For the hose 4, the following dimensions can be used: 1.5 to 20 mm in diameter and 5 m to 200 m in length. The hose is manufactured in a UV transparent material, for example. FEP. The hose has a passage, which is wrapped around the light source 23 to receive the light from here, but as in the shown embodiment also has belonging parts 4, which are not wound but merely serve for transport of the milk to and or from the pump as well as to and/or from the spiral winding 10. In the following is referenced to the spiral shaped hose 10, when the mention concerns the hose's use for the milk's irradiation.

Figure 2:
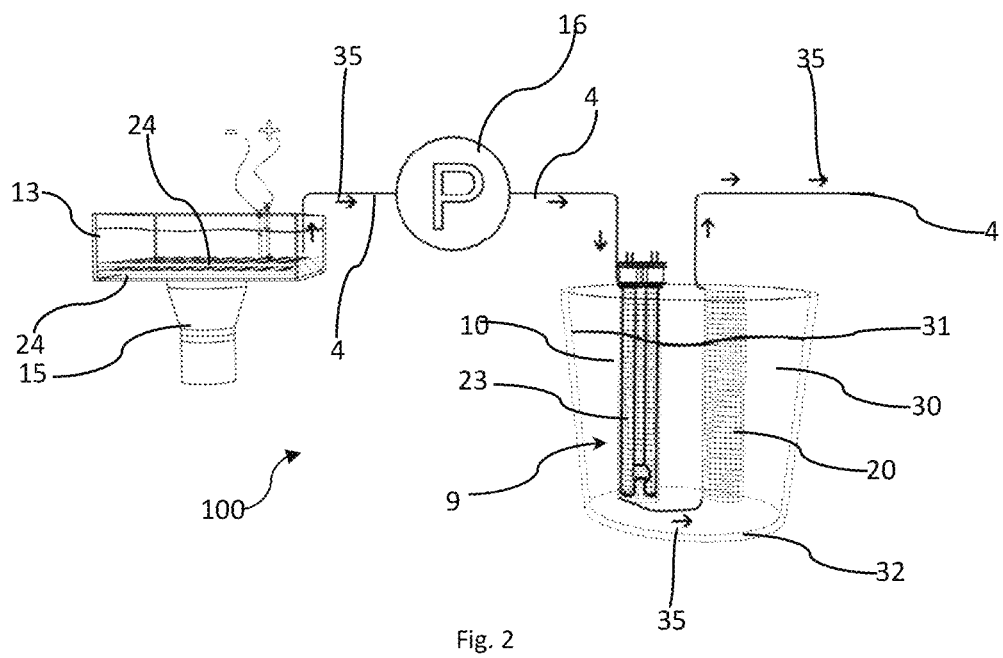
FIG. 2 shows the same process equipment 100, but without return flow.

The reactor 9 also includes a UV-C transparent liquid 30, which surrounds the hose and UV-C light source 23, and a spiral wound pipe 20 in metal. Liquid 30 is maintained at a constant temperature via suitable means hereto (not shown in FIGS. 1 and 2) such as refrigeration compressor and/or electric heater. A container 32 is designed to contain the liquid 30, the light source 23 and both transparent helical coiled hose 10 and coil-wound metal tube 20. In FIGS. 1 and 2 are also indicated a surface 31 of the transparent liquid 30, but the container 32 can also be a closed container, which is completely filled up with the liquid 30. The liquid is suitably consisting of water but can include other UV-C transparent liquids. The spiral shaped hose 10 is, due to the material, capable of withstanding the temperatures under which it is exposed during the treatment without taking any damage. At the same time, it has a good UV-C transparency, such that UV-C light from the light source 23 penetrates through the hose material without being dampened and hits the milk, which flows through the hose's interior inside diameter 5. Arrows 35 for marking the milk's flow direction are added FIG. 1 and FIG. 2.

The hose material is furthermore food approved and can be used during processing and production of foodstuffs.

The alternative to the preferred hose material can be quartz glass pipe (not shown) and other UV-C transparent materials, but since these are expensive in relation to the chosen polymeric material, they are not attractive with their current price.

Alternatives here require that it has a good UV-C transparency and can be processed into pipes. The used material is, for now, the only one that has been sufficiently UV-C transparent. Even plastic wrap barely lets any UV-C light through. Therefore, the requirement for this material is high in relation to the amount of UV-C that it lets through, since this is used to treat the liquid.

Depending on the consistency of the milk (thin-flowing or more low viscous tank milk/thick flowing more highly viscous raw milk or colostrum), it is the pressure or more correctly the pressure drop between the hose's 4 inlet end and its outlet, which squeezes the milk around in spiral or other formation, whereby the milk is distributed out to the inner surface 6 of the hose 4, where the milk is exposed to the UV-C light around the entire perimeter of the hose 4. This is especially important since milk is generally not particularly UV-C transparent.

By the circulation around in a spiral shaped hose 10, one can achieve a laminar flow with transverse flow components, which ensures that the milk, which flows along the hose's 4 internal surface 6 is continuously changed. This is seen as an important precondition for achieving the full effect of the UV-C light source, since the penetration depth for UV-C is milk is otherwise poor.

If the transverse flow component is not present, milk parts at the hose's internal surface will not, in the same way, be changed, and thus the non UV-C transparent milk in the central parts of the of the hose 4, near its middle line 8, will not become illuminated sufficiently.

The reactor's transparent hose 4 is shaped in a spiral or spiral like course 10, and the effect of the flow via the pipe's arrangement in circular windings in a spiral 10, is that the milk will rotate and be pushed out to the hose's internal surface 6, where there is applied drop of pressure from inlet to outlet.

For applying a pressure, the pump 16 is placed near the treatment tub 13. The pressure is applied for the purpose of passing the milk through the system and the pressure ensures that the liquid has sufficient speed for this having frequent replacement along the inner surface of the hose 6. If the pressure is not applied, none of these elements will occur and the treatment will be insufficient as only a small part of the milk will then become exposed to the UV-C light, namely the part that is close to the inner surface 6 of the hose and this milk can thus be at risk of being burned or destroyed. This means that the proteins and fat of the milk due to continuous irradiation with UV-C light will begin hardening and/or rancidity processes that completely change the taste, texture and odour of the milk, such that it becomes unfit for consumption for both humans and animals.

When the milk is sent through the hose 4 with a suitable pressure drop from the inlet to the outlet end, there will, due to friction between the milk and the hose's inner surface 6, occur flow parts across the hose's longitudinal direction, where the transverse flow component can be strengthened by guiding the hose non linearly over a longer distance, such as for example by guiding the hose 4 in spiral shape 10 with spiral windings in circular dense shape, such that the entire hose spiral covers a cylinder shape as shown in FIG. 1 and FIG. 2.

The treatment in the reactor 9 thus includes an irradiation of the milk with short wave radiation to affect bacteria, since these beams have a hampering and directly destructive effect on bacteria.

In the scientific literature, the range of the wavelength is specified, in which the bactericidal effect will be present between 222 nm and 282 nm [L Christen et al, January 2013]. Thus, it has been shown that UV-C light in this wavelength interval can treat and destroy robust bacteria such as *E. coli*. But 254 nm or more precisely: 253.7 nm, is the wavelength that causes the most damage to bacteria and can therefore best be included as part of the pasteurization process. The surrounding wavelengths will not have the same effective impact, but however still have an effect.

It is preferred that the distance between the light source and the milk is as small as possible in relation to the energy saving, since the distance due to the spread of the light also determines how much radiation energy, which does not hit and penetrate through the light translucent barrier 1, which the hose's 4 material thickness consists.

Curvature radii can vary in relation to the light source and the desire regarding turbulence or flow components across the longitudinal direction of the hose, however, a curvature radius is preferred internally of approximately 45 mm. Other alternatives could be everything from 20 mm to 600 mm.

To send the milk through a transparent hose and illuminate it from the outside is a way, whereby it can be ensured that all milk is illuminated equally. Of other methods can be mentioned shaking, tumbling, stirring and centrifugation, since there by each of these methods can be chosen between stationary light sources and flowing milk, or light sources, which are moved relative to a given amount of milk, for example immersed herein. By subjecting the milk to such effects with the simultaneous proximity of UV-C light source, a corresponding effect can be achieved.

Figure 6:
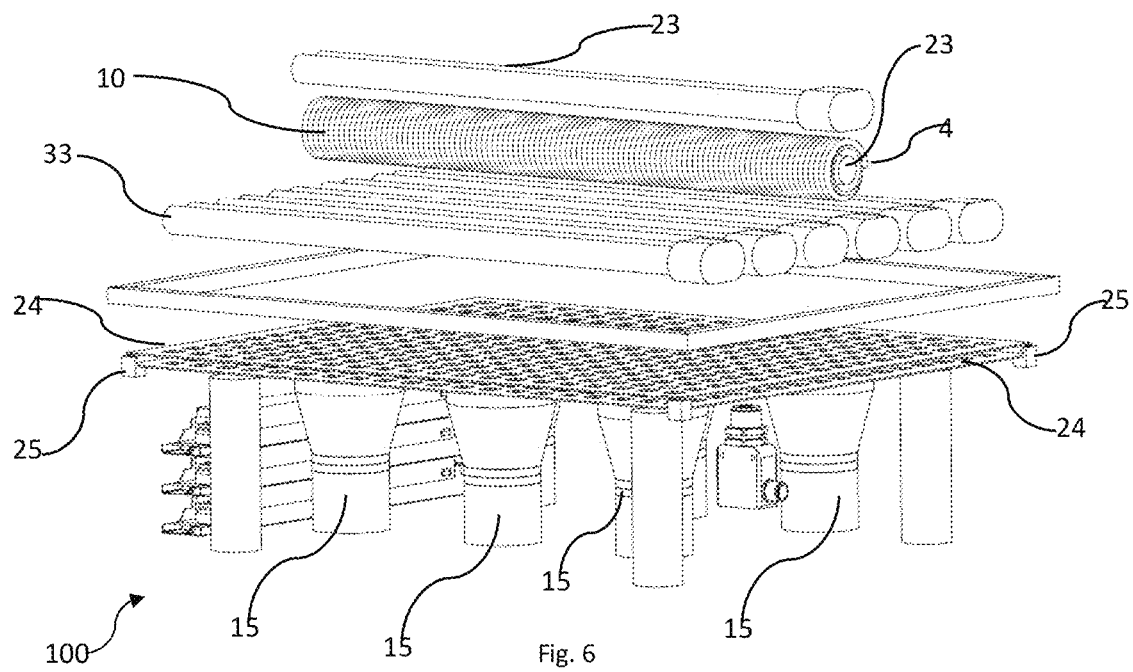
FIG. 6 shows a magnified section of the same view as in FIG. 5, where the treatment tub 13 is not shown so the electrodes 24 for ohmic heating are visible.

It is preferred, as shown in FIG. 1, FIG. 2 and FIG. 6, that the hose 4 is winded around a quartz glass pipe containing a light source, where the pipe both secures the hose 4 and the light source. The quartz glass pipe and the herein mounted light source here thus consist the light source 23.

Alternatives to this are that the hose 4 and the light source are fixed in another way, where one for example saves the material if the quartz glass pipe is left out and light source and hose are fixed in relation to each other without use of quartz glass pipe.

Figure 10:
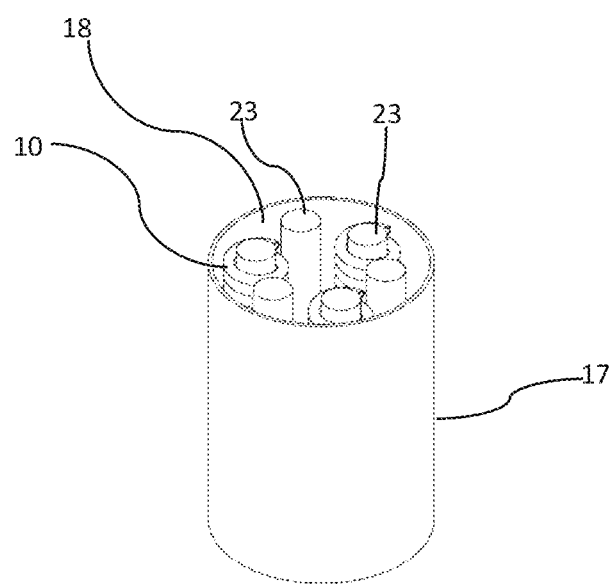
FIG. 10 is a reactor with alternating wrapped and non-wrapped light sources and belonging light sources 23 placed in a circle formation internally in a cylindrical reactor 17.
Figure 11:
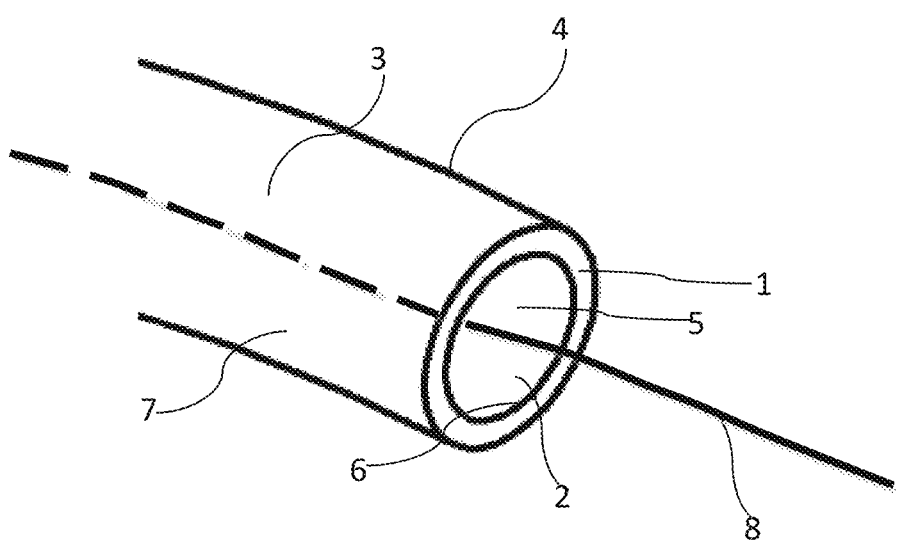
FIG. 11 shows a magnified section from FIG. 7, where the hose's 4 cross section and material thickness becomes visible.

It is important that the hose 4 is exposed to exposure of the light both externally in relation to the spiral winding 10 and inside. Inside, the exposure is optimal in the example in FIGS. 1 and 2 due to the shape of the spiral 10, which extends around the light source 23. Outside of the spiral winding 10, the larger surface, which is to be covered, can be met by putting more light sources 23 here to hit all points on the spiral winding 10. An example of this is shown in FIG. 10, where cylinder shaped light sources 23 are provided externally in relation to spiral shaped windings 10 that twist themselves around each own cylindrical light sources 23. Assembled, such an arrangement can be placed in a cylinder shaped container 17, possibly with an inner surface 18, which is reflective towards the UV-C light, which is outlined in FIG. 10.

There are many ways whereupon one can put up this, however, it requires that the hose 4 is led in appropriate bends or in spiral shape 10, and it is illuminated by the UV-C light. Here, bends or the spiral shape help to ensure replacement of milk between areas near the hose's inner surface and areas centrally in the hose, whereby all milk parts in the hose receive the same amount of light.

Figure 7:
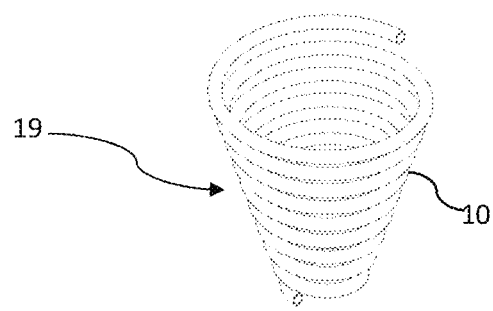
FIGS. 7, 8 and 9 show each own alternative course for a hose 4 with an internal stream of milk, and which is externally exposed to lighting.
Figure 8:
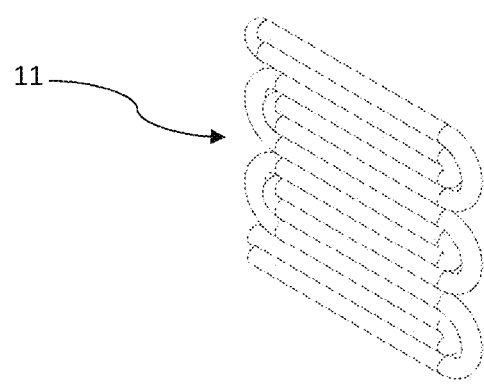
Figure 9:
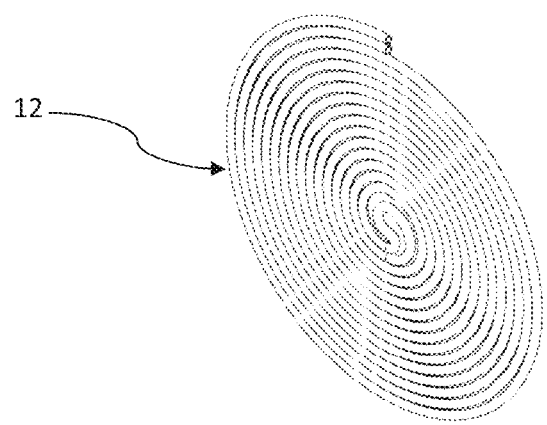

Some possible alternatives are here shown in FIGS. 7, 8, and 9, where FIG. 8 shows a possible flat course 11, à la the floor heat principle. This does however not provide the same effect in relation to getting all milk parts equally well illuminated, when the hose is illuminated from outside.

In FIG. 9 is seen a screw shape 12, which provides similar advantages but also drawbacks in the form of requiring special measures in order to hold the hose 4 in place in the wound shape, such that mass forces stemming from the possible turbulence of the milk or simply laminar flow in the hose does not get the hose to move itself uncontrollably.

In FIG. 7 is shown a cone shape 19, which may be advantageous in the same way as the snail shape 12 in FIG. 9, since the constant changeable curvature radius, can help to ensure transverse flow between the hose's inner surface and central parts of the cross section.

There can be reflection of the lamps' light through UV-C reflecting materials, as already mentioned in relation to FIG. 10, but this can in principle be realized in relation to any of the embodiments shown.

There can be used tubes with built-in UV-C bulbs, for example placed centrally in the pipe. This is not shown, but here the tube is thought to be replaced with a pipe, possibly with internal reflecting surface, and a centrally, in the pipe, placed cylindrical light source, which spreads the light equally in all directions, and where the milk is pumped longitudinally in a ring shaped gap between the light source and the surrounding pipe.

In material choice for the separation between the light source and the milk, iron-poor glass is an additional possibility, but immediately it is FEP and quartz glass, which provide the best UV-C transparency.

As it is seen in FIG. 1 and FIG. 2, there is in this embodiment of the invention, connected a spiral twisted pipe 20 after the hose's spiral loop 10 around the light source 23. This tube 20 is made of heat conducting metal such as copper, stainless steel or aluminum and is also immersed in the liquid, which is contained in the reactor. The fluid maintains a given temperature and the spiral twisted pipe 20 helps to ensure that the milk gets a minimum retention time at the prescribed temperature. At the same time, a heat supply at either the illumination or the carried out ohmic heating can be counteracted. Hereby, a heating to, for example, not above 60 degrees can be ensured, or there can be carried out a cooling of the milk to a lower temperature, if this is desirable.

Ohmic heating is a way of heating the liquid by subjecting it to the direct effect of an electrical current through supply of voltage to electrically conductive electrodes 24 immersed in the liquid, such that one uses the liquid or the milk directly as the heating element, where the liquid's conductivity or electrical resistance is utilized. The advantage is here that one can here stress the bacteria since they get both power and heat, which have a stress effect. That is, the two most important reasons for using this technology are heat and stress.

In FIG. 6. is seen the two identical electrodes 24, which in this embodiment are used for applying the liquid between the electrodes the desired electrical field or voltage loss.

FIGS. 1 and 2 the electrodes 24 for applying Ohmic Heating are shown, since treatment tub 13 is drawn up as transparent. A concrete design of the electrodes 24 is shown more clearly in FIG. 6, and here they have shape as each own possibly quadratic, perforated plate, arranged parallel to each other with a predetermined distance between them. The sizes of the plate shape may vary, but size of 138*138 mm and a thickness of 2 mm are possible appropriate measurements. Alternatives are from 15*50*1 mm to 600*600*6 mm. The shape with the many holes gives the milk a good opportunity to circulate between the electrodes.

Appropriately, the electrodes are manufactured from stainless and acid-proof material, for example steel in relation to for example norm 316, which ensures strength, processing and corrosion-resistance.

Alternatives to this are platinum or other non-corrosive conductive surface, such as gold-plated metal electrodes. The distance between the electrodes is maintained with plastic buttons 25 at a suitable distance from each other, for example, as shown in FIG. 6 with a button 25 in each corner of the electrodes 24. Other materials for these spacers are possible, for example, any non-conductive material of appropriate strength, for example ceramics. The thickness of the electrodes 24 and the surface area can, as mentioned, be varied, but the shown simple grid provides certain advantages in relation to manufacturing technology and maintenance.

By Ohmic Heating there will occur electrolysis of the water component in milk, and thus be deposited small amounts of hydrogen and oxygen in the milk. However, the quantities are so small that they have no practical or safety significance for the use of the device.

For stressing the bacteria, there can alternatively be used a high voltage system such as 10-30 kV alternating voltage and a higher frequency range, but this has no or poor heat generation and a completely different and costly technology must be used to achieve the same effect, if the milk is also to be heated and the low voltage system is therefore preferred.

The tempering, which the milk is exposed to by ohmic heating and by passage of the metal tube 20 into the reactor 9, is important in order to maintain a constant temperature in the system, since the consequence of rising above 60 degrees is that the milk is thereby fried off and especially the raw milk's many sensitive antibodies and other proteins can take permanent damage. Tempering is necessary as both ohmic heating and the UV-C lamps emit heat to the milk, and thus require better control of the temperature.

Current optimum temperature is 58-59 degrees Celsius for raw milk, which is the temperature limit, which can be used without damaging the raw milk in the shown system.

Alternatives can be from 55 degrees Celsius to 60 degrees in raw milk. 3 degrees Celsius to 74 degrees Celsius preferably 20 to 60 in ordinary milk. The higher temperature there is used, the more efficient a temperature control is required, since any temperature control can only ensure the temperature within a given accuracy.

Figure 4:
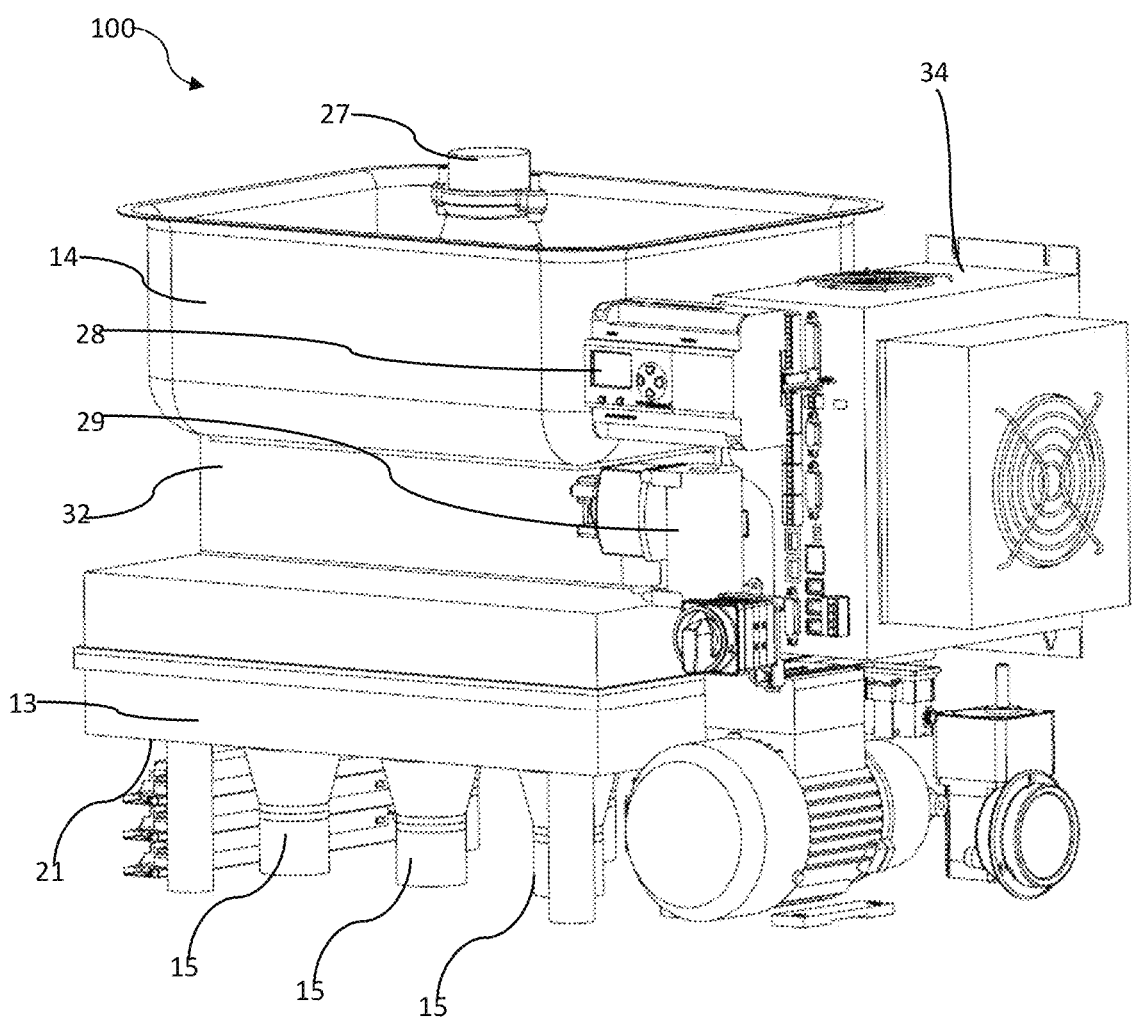
FIG. 4 is the system in FIG. 3 shown without external walls.

The treatment tub 13 shown in FIG. 4 is described in more detail here. Size of the tank shown is 430×350×40 mm. This size is chosen corresponding to that the milk yield from a regular milking company in Denmark will be able to pass through the device during milking. The effect of the chosen measurements is here that volume of milk that can be driven through the device is 100 L/hour. Smaller units will not make sense for dairy cattle. However, the size can be varied up to 600*600*600 mm, or larger depending on which amount of milk is desired to be processed per unit of time.

In the treatment tub 13, the milk is stored simultaneously with the tub 13 providing possibility for adding to the milk both Ohmic heating and ultrasound. In relation to ultrasound, the bottom 21 of the treatment tub 13 is used as speaker membrane for the ultrasound transducer 15, which produces the ultrasound field.

Figure 5:
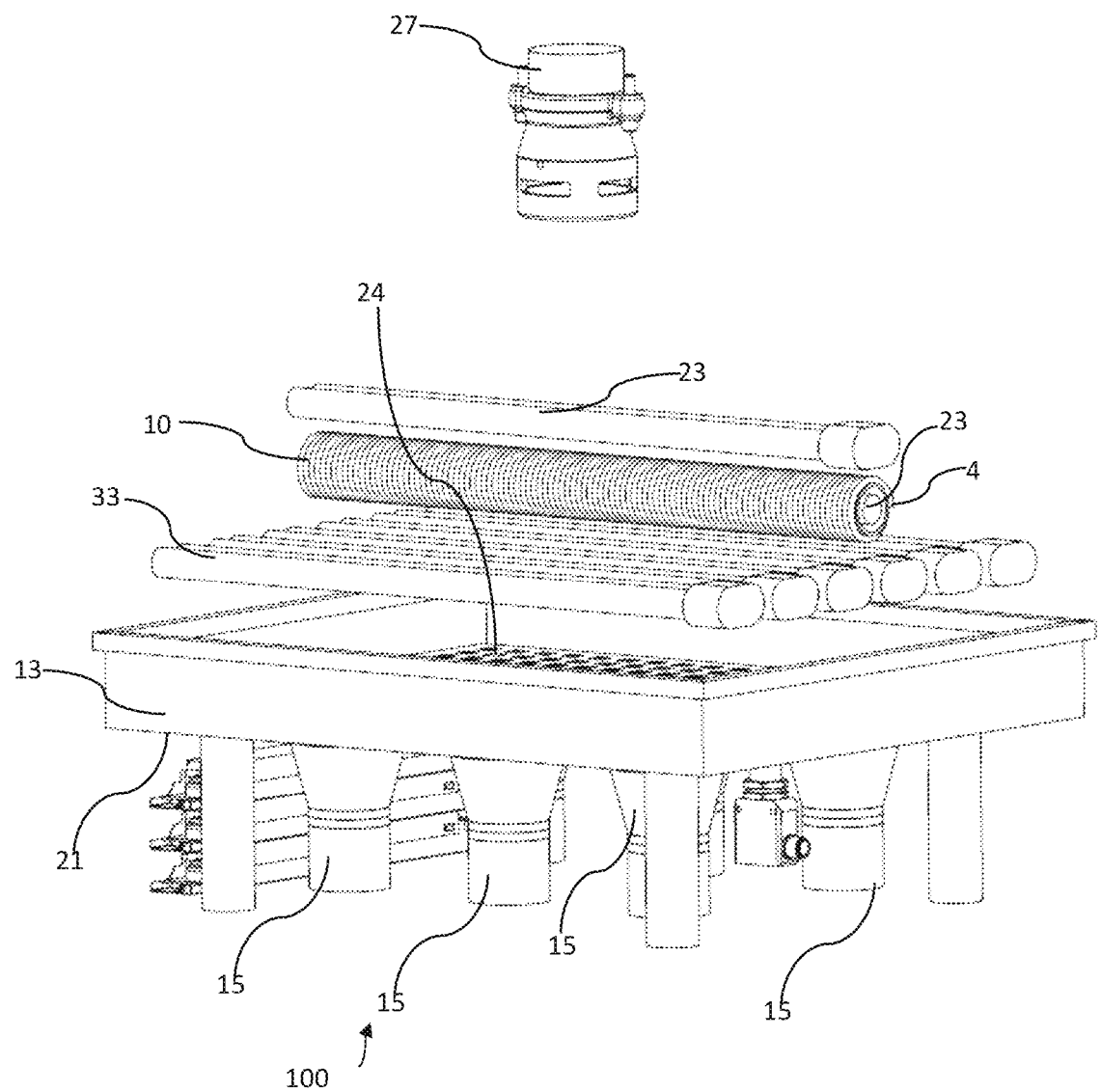
FIG. 5 shows the central parts of the system in FIG. 4.

The function of the tempering tub 32 is to either heat or cool light sources 4 and milk. This occurs by keeping the water in the tub at a constant temperature such that the milk, which circulates in the hose 4, 10 and through the spiral wound metal pipe 20 gets the same temperature as the water even if significant amounts of heat are emitted from the light source 23. In other words, the reactor 9 is embedded in the tempering tub 32, as shown in FIG. 4 and FIG. 5. Common means for maintaining a constant temperature in the water are used here, for example heat exchanger or heater in combination with a cooling function. The water must be fairly clean, such that it is UV transparent. Liquids other than water can be used, but the relatively high heat capacity of the water and UV transparency make it the preferred liquid. Appropriate thermosensors and an electronic control circuit or microcomputer are e.g. used to ensure stable temperature by control of heat supply line and/or cooling.

In FIG. 5 and FIG. 6, the tempering tub 32 between the storage tub 14 and the treatment tub 13, is not seen, since only the internal components in the tempering tub 32 are visible. These include an elongated light source enclosed by a quartz glass pipe wrapped with the hose 4 in spiral shaped winding 10.

Effective temperature control especially of the UV-C lamps is important as these require an operating temperature of about 60 degrees, for optimum radiation delivery. The intake temperature to the spirals of the non-transparent liquid, which is desired to be irradiated is, for tank milk, typical room temperature, while it for raw milk is optimally 58-59 degrees Celsius. The significant is that the irradiation occurs at 60 degrees Celsius by the UV-C lamp, since it requires this to be able to irradiate with exactly 254 nm.

Ohmic heating is controlled via a transformer, whereby the low voltage electrodes in the milk are provided with suiting voltage for achieving the desired electric current through the milk.

The ultrasound transducers 15 provided with a suiting electrical signal from a generator designed for the purpose, and here, intensity or volume/amplitude of the signal can be regulated via a suiting automatic control.

Figure 3:
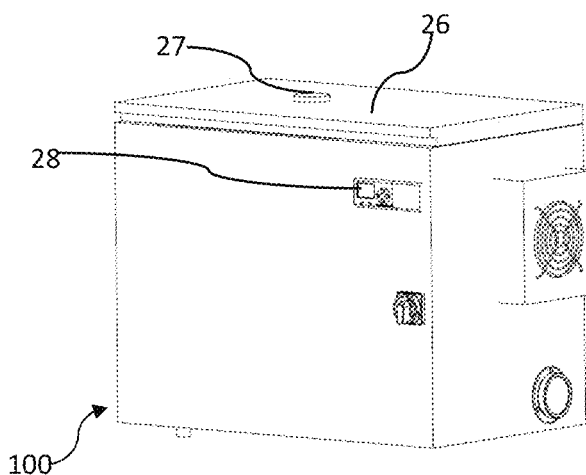
FIG. 3 is a 3d depiction of an example of a device 100 seen from outside containing the necessary components in the device for the treatment of milk.

In FIG. 3 is shown the device seen from the outside, and here is only one lid 26 with milk inlet 27 and some other details visible. However, the device can be mobile via attached wheels (not shown) and has a display 28, such that a user can be informed of the device's operating state and/or supply user input to the device.

FIG. 4 and FIG. 5 show a number of ultrasound transducers 15 and these are provided at the bottom of the treatment tub 13. The transducers 15 are designed to deliver an ultrasonic field or an ultrasound signal up through, or via, the bottom 21 of the treatment tub 13 and into the milk here. Thus, the milk around and over the electrodes 24 will become exposed to a powerful ultrasonic field.

In FIG. 4 is additionally seen the pump 16 with belonging motor.

In addition, there is shown a flow apparatus for temperature control 29 as well as various electronic components, which are required in order to provide the required electrical power to both ultrasonic transducers 15, light sources 23 and ohmic heating electrodes 24.

The temperature in the treatment tub 13 is kept up or raised via an ordinary throughput heating unit.

This is only intended to raise the temperature if cold milk passes through, as it must be at least 25 degrees for ohmic heating to have an effect.

The row of UV-C tubes 33 is located inside tempering tub 32 together with the reactor 9. These tubes 33 are positioned such that although the milk has passed through the reactor, it will still be able to post-treat the milk when this is present in the treatment tub 13 (with ohmic heating and ultrasound) as the rays reach through and down on the milk in the treatment tub 13 and will have an effect here.

The UV-C treatment provides plenty of heat, so heating is not required here. The biggest task is to cool the milk again so that it does not overheat, which cooling element 29 can cause. Tubes, pipes and pumps between various parts of the device 100 are not shown in FIG. 4, FIG. 5 and FIG. 6.

The temperature control takes place through the multi-controller 34, whose location is not critical, but conveniently it is located close to a user interface, for example display 28. The multi-control 34 includes: power supply, refrigeration compressor and a cooling element.

The UV-C transparent liquid is led from the tempering tub 32, in to this multi-controller, where its temperature is regulated up or down as needed and out again.

The reference: [L Christen et al, January 2013] L. Christen, C. T. Lai, B. Hartmann, P. E Hartmann, and D. T. Geddes, "Ultraviolet-C Irradiation: A Novel Pasteurization Method for Donor Human Milk," PLoS One, vol. 8, no. 6, p. e68120, January 2013 explains about sterilization of human milk.

The technologies used by the invention are extra important for treatment of colostrum, as parts of this viscous fluid has a tendency to accumulate in fat lumps, but upon exposure to mechanical stress, it becomes more homogeneous and fats more evenly distributed.

These technologies are included in the two devices, which can each replace the original way of pasteurizing, which is both energy and time consuming. In addition, it is not all tough bacteria, which the ordinary pasteurization process can remove, and furthermore, the ordinary pasteurization technology is quite resource demanding.

Colostrum and tank milk can, in principle, be treated with the same device, but it is preferred that there for tank milk is used as a device, which is designed as a throughput device, where fully treated milk is sent directly further to storage tank or other processing. When treating colostrum, a device is used that retains the finished treated milk in a local tank so that the raw milk is not mixed with the rest of the milk produced from a dairy herd. At the same time, consideration must here be given to that colostrum is more viscous and therefore requires higher pumping capacity and/or thicker hoses.

The invention's technology can, in principle, be used for milk from any domestic animal, and it should be mentioned that milking of horses in certain parts of the world is carried out for consumption, and here the technique could also be used.

Juice, hospital sewage, which is difficult and expensive to treat, so bacteria is fully avoided, can also possibly be treated with the technology according to the invention). This concerns soups and sauces in the food industry.

Example of sterilization done on raw milk

There is sterilized:

450 ml raw milk with Brix 24-32%

The equipment for the sterilization is the equipment in FIG. 1.

20 kHz ultrasound transducers are used.

The treatment tub measures 120×120×50 mm.

Via a hose, the milk is led from the ultrasound tub, 13, along to three PTFE spirals with an inner diameter of 4 mm and 1 mm material thickness, which gives a total length of about 24 meters. The volume speed is at 960 ml/min at a Brix of 22-24% and with 6.9 bar in inlet pressure on the spirals.

Ultrasound treatment and ohmic heating are carried out on the raw milk during its retention time in the ultrasound treatment tub.

Used effect on the ultrasound transducers 100 watt

Used effect on the electrodes for ohmic heating 270 watt

The raw milk is illuminated with ultraviolet light 254 nm, UV-C, with an effect of 420 watt.

A heating unit warms the milk to 58 degrees Celsius, whereafter the milk is recirculated to the ultrasound tub.

Screening of the raw milk's content of somatic cells (SCC) number occurred by use of a Delaval Cell Counter (DCC) (DNA staining-propium iodide) (mobile on the farm)

The following microorganisms were used for the test:

Gram negative bacteria:

*Escherichia coli* k2bh2 (mastitis isolate)

*Pseudomonas fluorescens* {CCUG 125 3 T)

*Serratia liquefaciens* {CCUG 9285)

*Proteus vulgar* is {CCUG 10784)

2 strains *Salmonella dublin*

Gram positive bacteria and yeast:

*Enterococcus faecium* (DSM 7134—milk substitute}

*Lactobacillus rhamnosus* (DSM 7133—milk substitute}

*Bacillus* spp. (isolated from cow milk—not spp characterized}

*Micrococcus luteus* (ATCC 9341=CCUG10782}

*Streptococcus equiisimilis* subsp *dysgalactiae* 08 (mastitis isolate}

*Staphylococcus aureus* A25 (mastitis isolate)

*Candida albicans* (ATCC 10231=CCUG19915}.

The above-mentioned microorganisms were used for manufacturing of swab material for raw milk samples, which were subsequently sterilized. Swab materials:

Mixed Gram positive and Gram negative flora

Separate Gram positive and separate Gram negative flora

Natural flora in milk subcultured at: short, respectively long-term storage in refrigeration, at room temperature and 37° C.

Raw milk inoculated with subcultured milk flora

Results:

Bacteria level at start about 80.000.000 TPC and about 20.000.000 TCC after recirculation in the device a specified time is achieved the following reductions in bacteria number:

| Time for recirculation, raw milk (min) | Total Plate Count (TPC) | Total Coliform Count (TCC) |
|---|---|---|
| 0 | 80.000.000 | 20.000.000 |
| 5 | 268000 | n.d. |
| 7.5 | 104000 | 13 |
| 10 | 32000 | 2 |
| 12.5 | 11300 | 0 |
| 15 | 3900 | 0 |
| 20 | 60 | 0 |

The test on raw milk is carried out with recirculation of treated raw milk. As a result of this, treated raw milk is continually mixed with non-treated raw milk. This means longer treatment time in order to achieve total bacteria kill. In practice one would use the device without recirculation for sterilization of raw milk like it has occurred below in the example for tank milk.

Example of Sterilization of Tank Milk

The equipment is the equipment in FIG. 2.

The light source for tank milk includes 3 pieces of spirals wrapped in a diameter of about 58 mm over a distance of about 26 cm with a hose of 4 mm external thickness and 0.5 mm in material thickness, which provides a total length of about 35 m.

Method

The flow is continuous and is about 960 ml/min or 60 L/hour.

Ultrasound treatment and ohmic heating are carried out on the tank milk during its stay in the ultrasound treatment tub.

Used effect on the ultrasound transducers 200 watt

Used effect on the electrodes for ohmic heating 270 watt

The tank milk is irradiated with ultraviolet light 254 nm, UV-C, with an effect of 150 watt total on the three spirals with about 6 bar inlet pressure on the spirals.

The tank milk is sent through the sterilization device and has, by the inlet to the treatment tub for ultrasound treatment, room temperature.

The tank milk is only heated a little because of ohmic heating and as a result of the UV-C treatment.

The tank milk is not recirculated to the treatment tub dedicated to ultrasound treatment, but is led to a collection tank.

Results

Figure 12:
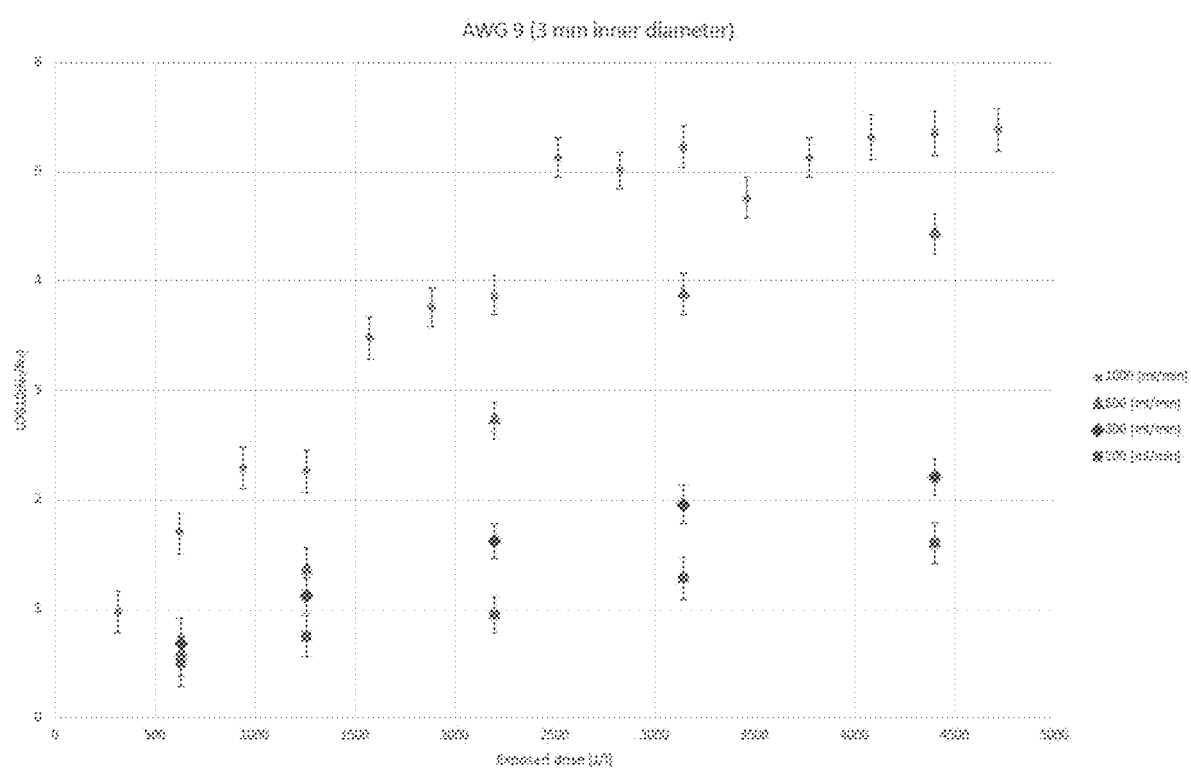
FIG. 12 shows the relative bacteria number reduction in logarithmic scale, as function of exposure dose.
Figure 13:
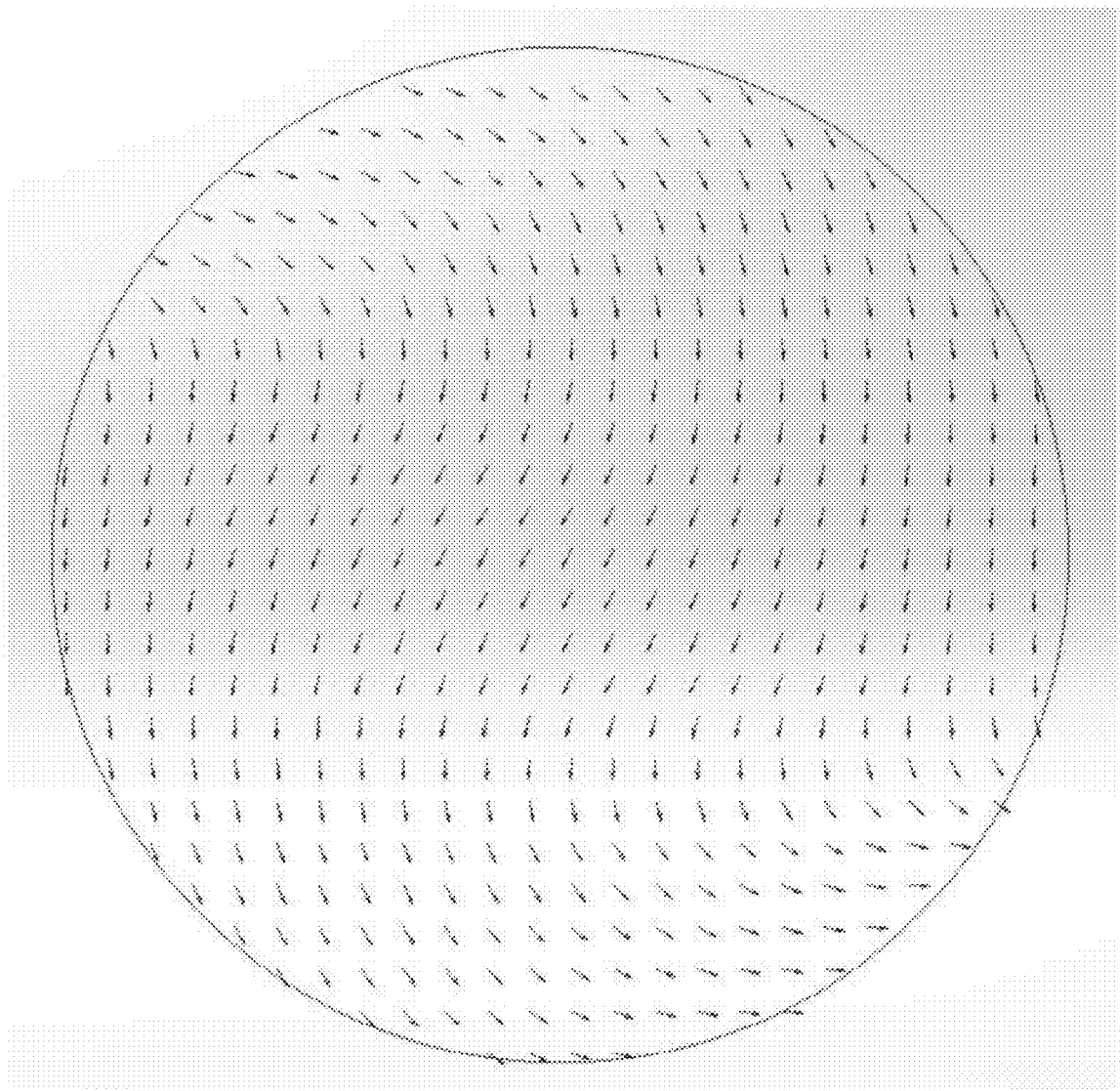
FIG. 13 shows simulated flow pattern in cross section of hose 3 mm in diameter, as a flow speed of 200 ml/min.
Figure 14:
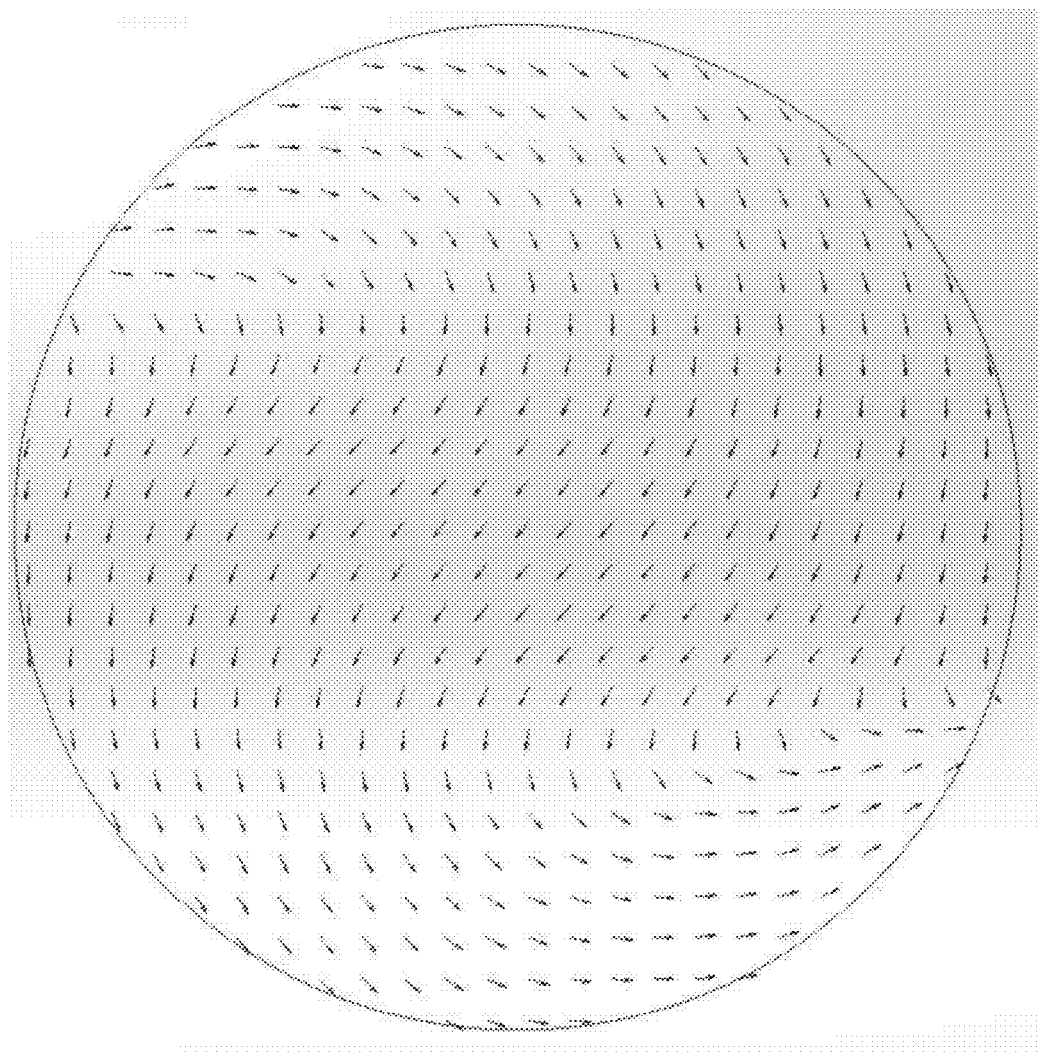
FIG. 14 shows simulated flow pattern in cross section of hose 3 mm in diameter as a flow speed of 300 ml/min.
Figure 15:
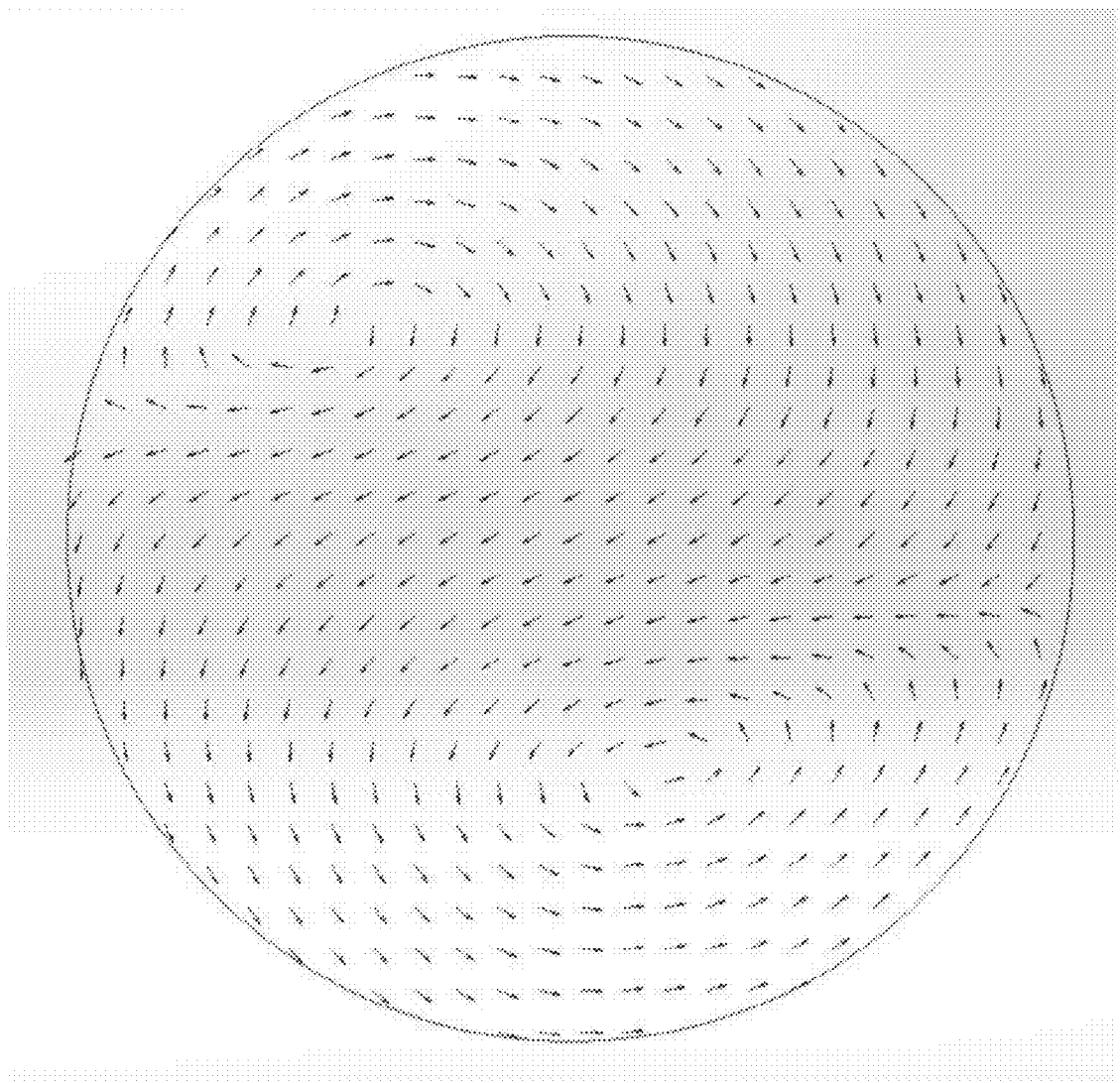
FIG. 15 shows simulated flow pattern in cross section of hose 3 mm in diameter, as a flow speed of 600 ml/min.
Figure 16:
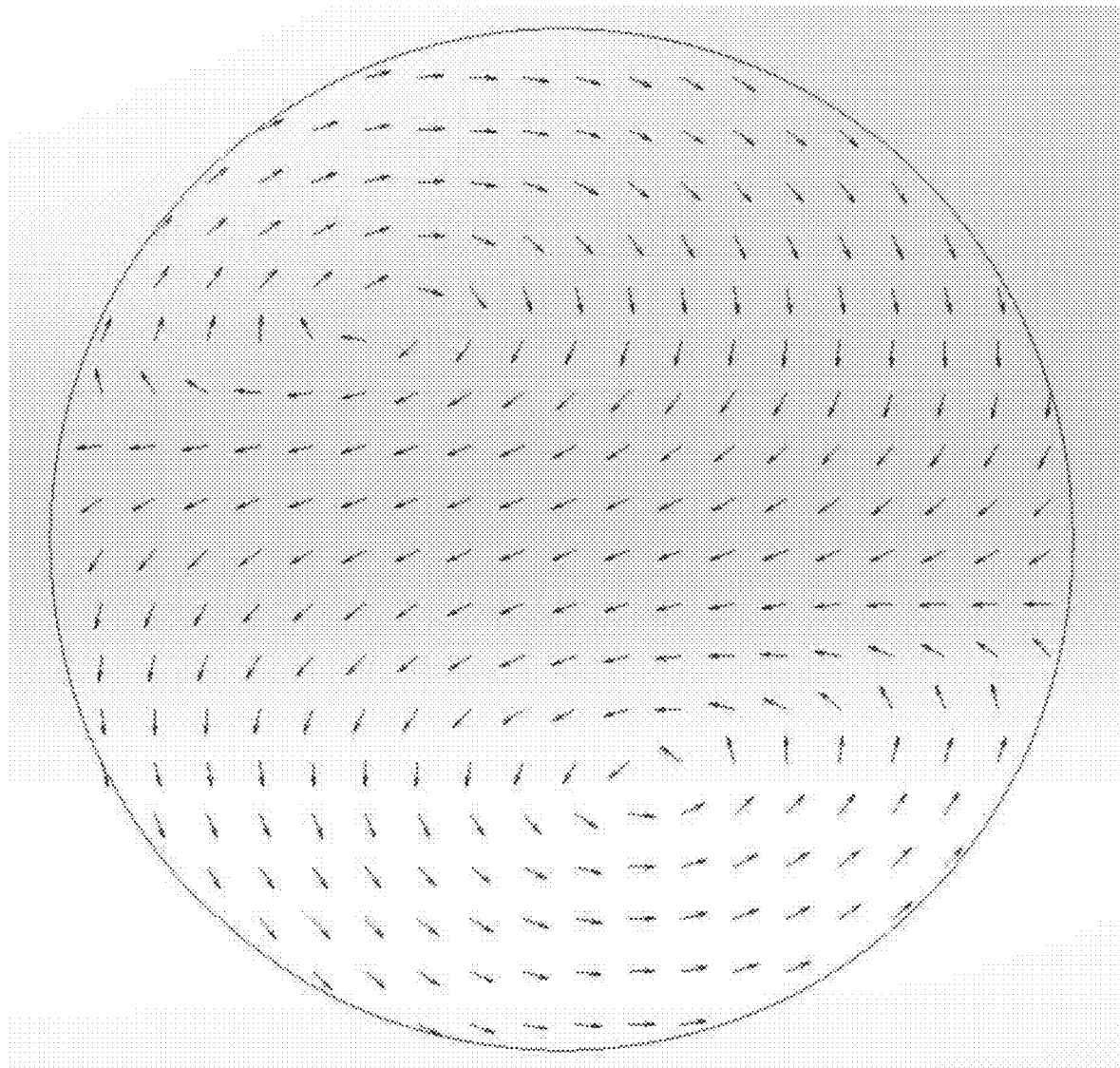
FIG. 16 shows simulated flow pattern in cross section of hose 3 mm in diameter, as a flow speed of 1000 ml/min.

The inactivation of the total bacteria number on tank milk samples taken after completed sterilization carried out with UV-C irradiation alone is shown in FIG. 12. FIG. 12 shows that the inactivation increases sharply with increasing flow speed in the spirals, which are here AWG=American wire Guard no. 9, which corresponds to an inner diameter of 3 mm and with a material thickness 0.5 mm. FIGS. 13 to 16 show the flow patterns in the spirals at four flow speeds. The model thus simulates an increased replacement of fluid parts along the inside of the spirals is apparent due to the increased speed in the fluid.

Figure 17:
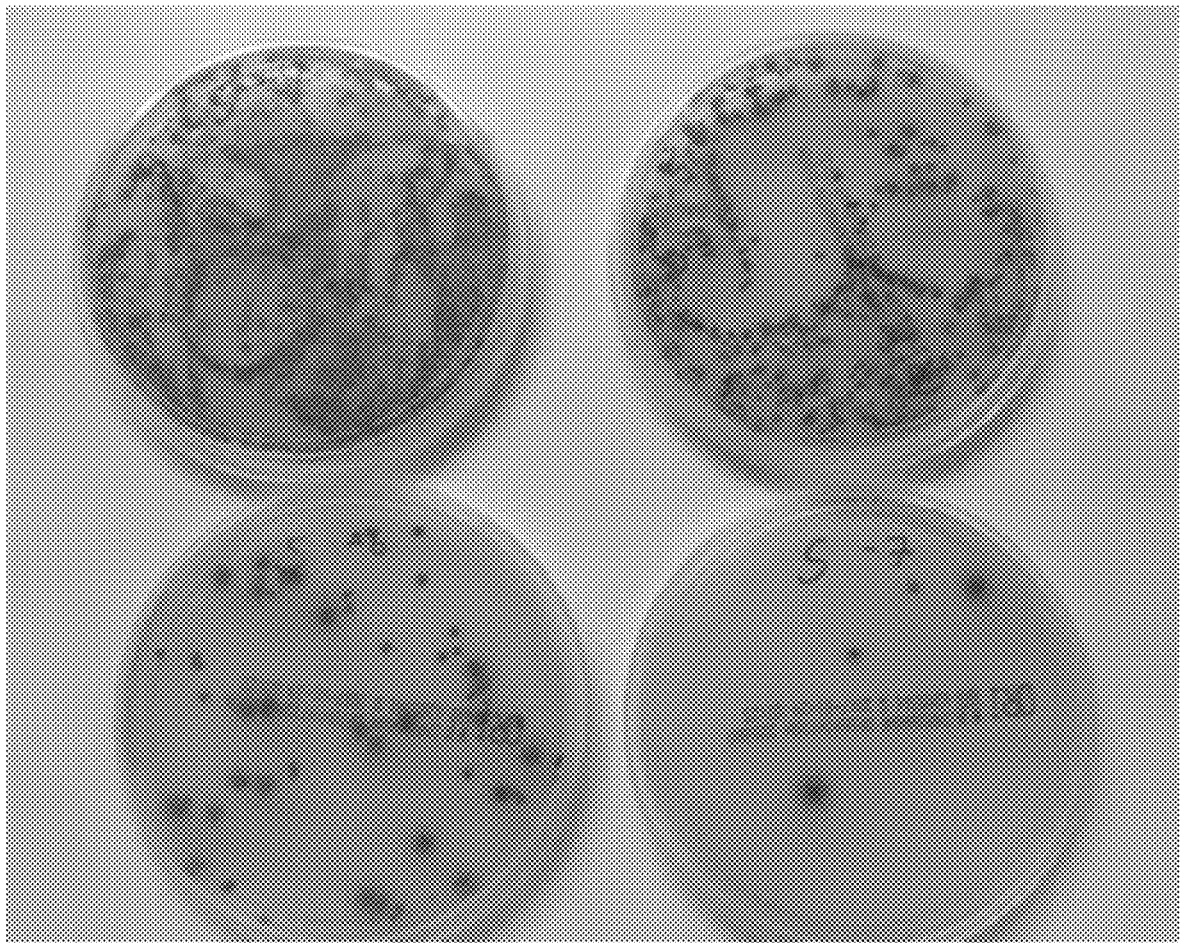
FIG. 17 is a photograph of petri dishes with $10^4$-$10^7$ dilutions from tank milk before sterilization.
Figure 18:
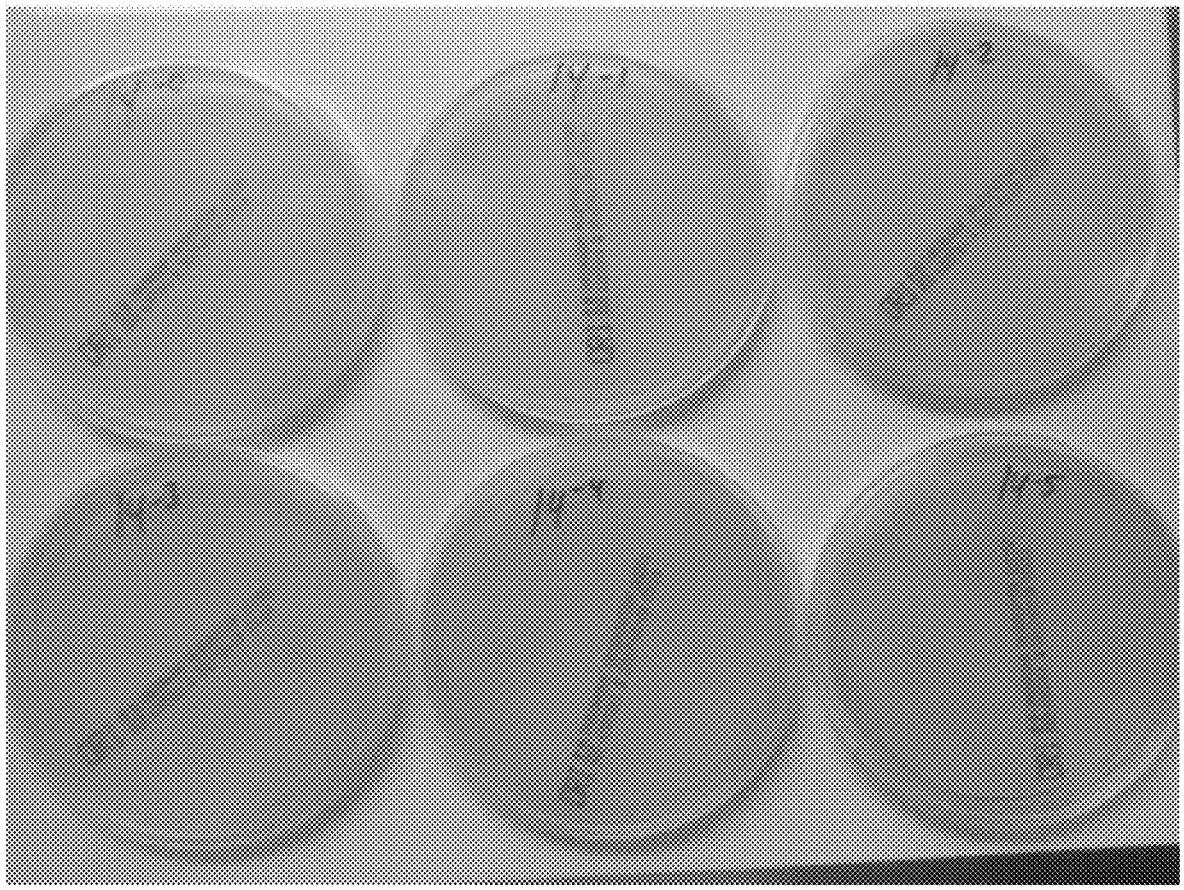
FIG. 18 is photograph of petri dishes with 10-105 dilutions from tank milk after sterilization, FIG. 19 content of microorganisms in tank milk (Log CFU (colony forming units)/ml milk), without pasteurization, after pasteurization by known method and sterilization by the method according to the invention.

An example of the sterilizing effect on tank milk is shown in FIG. 17 and FIG. 18. A total of 12 tank milk samples were examined from the same pool. The 9 samples showed a total bacteria death by the sterilization, while only 3 samples showed a large bacterial death, but not total. This may involve contamination of the samples after sampling.

The bacteria number was high before treatment (FIG. 17). No bacteria were found in tank milk after the sterilization, even without dilution of sample at the end of treatment (FIG. 18).

Figure 19:
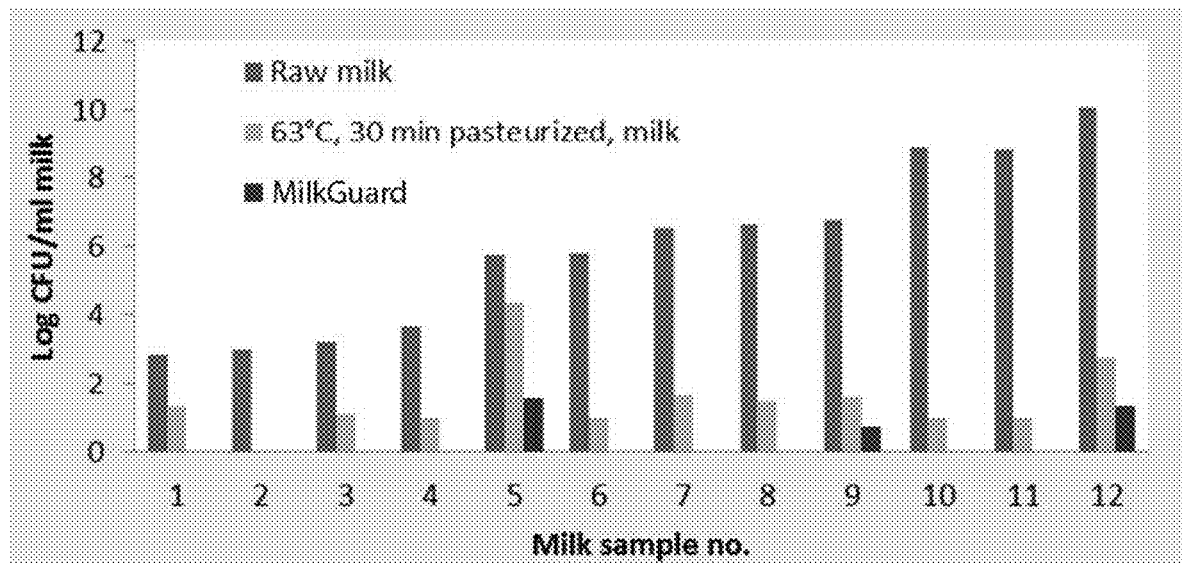
Figure 20:
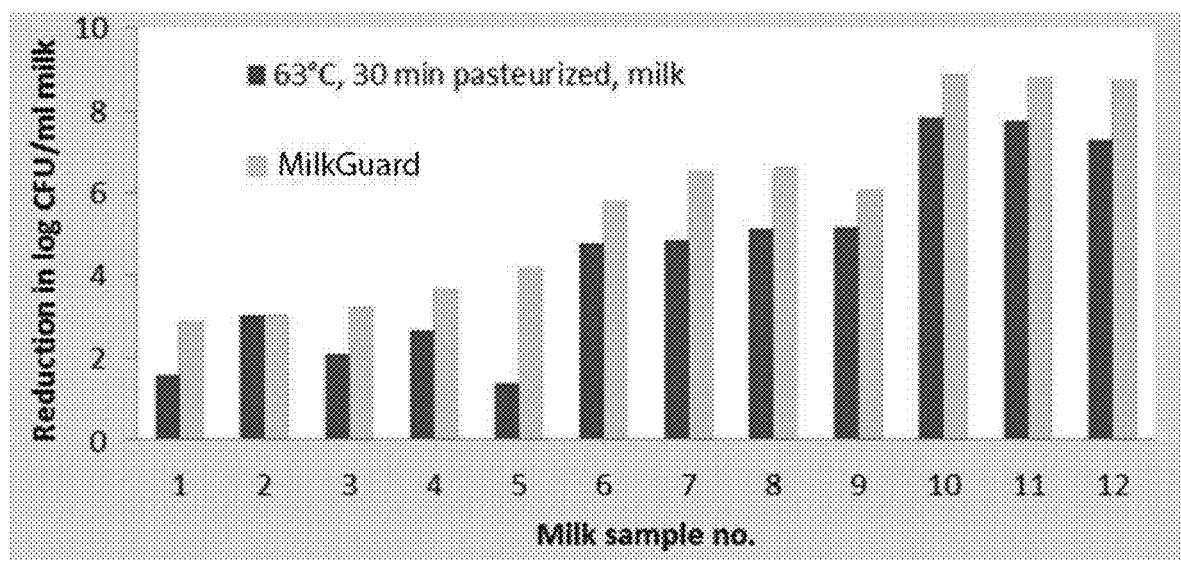
FIG. 20 shows killing of microorganisms (log CFU untreated milk-log CFU treated milk) after respectively pasteurization by known method and after sterilization by the method according to the invention.

FIG. 19 shows total bacteria number as Log CFU, and FIG. 20 shows reduction in total bacteria number as log CFU non-treated milk-log CFU treated milk. "Raw milk" means the inoculated and non-sterilized tank milk, "milkGUARD" means tank milk sterilized at the experiment, as described above in this example. 9 tests out of 12 had a bacteria number of 0 after completion of sterilization, while 3 had a very small bacteria number, which may be due to artifacts or simple contamination of the samples during sampling or cultivation. The tests show that the method of sterilization, which is performed at low temperature is effective for gentle sterilization of tank milk.

Figure 21:
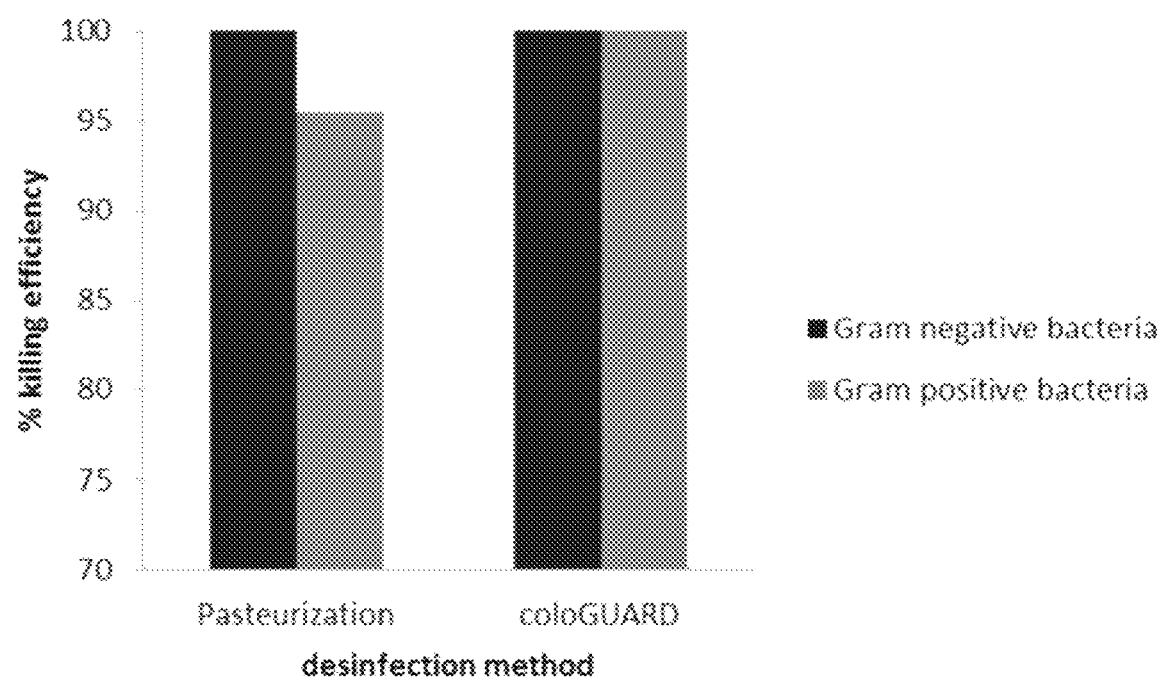
FIG. 21 shows the effectiveness of the invention in the form of killing of viable microorganisms by the method according to the invention compared to pasteurization by conventional methods.

The effectiveness of the sterilization method according to the present invention results in 100% killing of Gram negative bacteria like conventional pasteurization at 63 degrees Celsius, see left part of the double columns in FIG. 21. In the case of Gram positive bacteria, the bacteria killing is still 100% by the present invention, while the bacteria killing is insufficient by ordinary pasteurization.

The effect, which is necessary for sterilization by the method according to the present invention of larger amounts of tank milk is estimated to:

| 100 liter tank milk | |
|---|---|
| Sonication | 600 W |
| Ohmic heating | 1800 W |
| UV-C | 450 W |
| Total | 2850 W |
| 360 liter tank milk | |
| Sonication | 1200 W |
| Ohmic heating | 2040 W |
| UV-C | 960 W |
| Total | 4200 W |

Independently of which amount, which is desired to be sterilized, the used effect for sterilization will be a lot smaller than by known techniques. Use of ultrasound treatment together with ohmic heating and with or without heat does not remove *E. coli* and other bacteria in sufficient degree.

REFERENCE NUMBERS

1 Light translucent barrier
2 First surface of the light translucent barrier
3 Opposite surface of the light translucent barrier
4 Hose of polymeric material
5 Inside diameter
6 Internal surface
7 External surface
8 Center line for the hose
9 Reactor
10 Spiral shaped hose
11 Flat course
12 Screw shape
13 Treatment tub
14 Storage tub
15 Ultrasound transducer
16 Pump
17 Cylinder shaped container
18 Internal surface of cylinder shaped container
19 Cone shape
20 Spiral twisted metal pipe
21 The bottom of treatment tub 13
22 The tempering tub
23 Light source
24 Electrically conductive electrodes
25 Plastic buttons
26 Lid
27 Milk inlet
28 Display
29 Flow device for temperature control
30 UV-C transparent liquid
31 Liquid surface
32 Container and tempering tub
33 Row of UV-C pipes
34 Multi control
35 Arrow for the milk's flow direction
100 Process equipment or device for treatment of milk

What is claimed is:

1. A process equipment for sterilizing milk, wherein the process equipment comprises a tempering tub with a light source for irradiation of the milk with UV-light with a predetermined ultraviolet wavelength, the process equipment additionally comprising a separate treatment tub, and wherein the separate treatment tub comprises at least one ultrasound transducer designed to send ultrasound through the milk and at least one unit for ohmic heating by sending current through the milk.

2. The process equipment according to claim 1, wherein the tempering tub is in liquid connection with, and placed flow-wise after, the separate treatment tub, in which the milk is treated with the ultrasound and the ohmic heating.

3. The process equipment according to claim 1, wherein the process equipment additionally includes a tempering unit designed in at least one of the separate treatment tub or the tempering tub.

4. The process equipment according to claim 1, wherein the ohmic heating is acquired for being carried out by adding a potential difference over the milk.

5. The process equipment according to claim 1, wherein the light source is designed for irradiation with light with a predetermined wavelength, which wavelength is placed within the interval 222 nm to 282 nm.

6. The process equipment according to claim 5, wherein the wavelength is placed within the interval 253-254 nm.

7. The process equipment according to claim 1, wherein the light source is designed with a light translucent barrier with a first surface along which the milk flows and since there at the other surface of the light translucent barrier is provided the light source, which emits light with the predetermined wavelength.

8. The process equipment according to claim 1, wherein the light source is designed with a light translucent barrier with a first surface along which the milk flows and since there at the other surface of the light translucent barrier is provided the light source, which emits light with the predetermined wavelength, and the light translucent barrier includes a hose with an internal bore and an internal surface, along which the milk flows and an external surface, where the process equipment also includes a pump, which is designed to send the milk from the treatment tub and through the hose's inside diameter with a certain flow speed.

9. The process equipment according to claim 8, wherein the hose is wrapped in spiral formation around a light source, such that the hose's continuous curvature along with the flow speed, which the pump imparts the milk through the hose, ensures a flow through the hose, whereby liquid parts of the milk near the inner surface of the hose are continually replaced with liquid parts of the milk closer to the hose's center line.

10. The process equipment according to claim 8, wherein the hose has a circular cross section and is manufactured from polytetrafluoroethylene, wherein the polytetrafluoroethylene is a synthetic fluoropolymer of tetrafluoroethylene, or fluoride substituted ethylene propylene.

11. The process equipment according to claim 1, wherein there is also designed a set of electrically conducting electrodes for application of the milk between the electrodes a predetermined average electrical current density through maintenance of a potential difference between the electrodes.

12. The process equipment according to claim 11, wherein the electrodes are designed as surface electrodes or grid electrodes.

13. The process equipment according to claim 12, wherein each electrode is connected to a voltage source designed to give the electrodes either a varying and changing voltage or an even voltage.

14. The process equipment according to claim 1, wherein the process equipment is connected to one or more ultrasound transducers designed to deliver the milk an ultrasonic field with a predetermined field strength and frequency composition for ensuring separation of clumped protein and/or fat parts in the milk.

15. The process equipment according to claim 1, wherein the milk is a tank milk, and wherein the tank milk is exposed to the ultrasound at a temperature of 18 to 24 degrees Celsius.

16. The process equipment according to claim 1, wherein the milk is a raw milk, and wherein, before or during the raw milk is exposed to the ultrasound, the raw milk is heated or cooled in a passive heat condition to a temperature of 55 to 60 degrees Celsius for ensuring optimum sterilization and for ensuring that a protein of the raw milk is not broken.

17. A method for sterilization of milk from domestic animals by the process equipment of claim 1, wherein the milk is irradiated with UV-C light with an ultraviolet wavelength, wherein the milk is previously exposed to ultrasound treatment and ohmic heating, where ohmic heating is carried out either simultaneously with ultrasound treatment or thereafter before irradiation with the UV-C light.

18. The method according to claim 17, wherein the milk is tank milk, which, when it is exposed to ultrasound treatment, has a temperature of 18 to 24 degrees Celsius.

19. The method according to claim 17, wherein the milk is raw milk, which before or during the ultrasound treatment is heated or cooled by use of a therefore designed heating device respectively passive heat loss for the surroundings to 55 to 60 degrees Celsius, preferably 58 to 59 degrees Celsius for ensuring optimum sterilization and for ensuring that the raw milk's proteins are not broken down.

20. The method according to claim 18, wherein the adjustment to the temperature intervals occurs by use of the ohmic heating.

21. The method according to claim 17, wherein the milk at the UV-C treatment is brought to flow in a hose with a light translucent barrier, since all the milk is brought to flow along the barrier's inner side at a time in the retention time in the hose.

22. The method according to claim 17, wherein ohmic heating is carried out by adding an electrical field over the milk, preferably a field with changing polarity, wherein polarity change and field strength are chosen such that the milk in the electrical field is heated due to the milk's resistance.

23. The method according to claim 17, wherein the milk is led through a treatment tub and is here exposed to current stress and consequent resistance heating and for ultrasound, since the milk via a pump is sent from the treatment tub and through a UV-C transparent hose wound in spiral shape around a light source and is then led through a metal pipe, since both the hose and the metal pipe are immersed in a tempering tub, in which there is maintained a constant temperature.

24. The method according to claim 23, wherein the milk is sent back to the treatment tub after the treatment with UV-C light.

25. The method according to claim 17, wherein the milk is added to the device directly after the milking, and that the milk, after the treatment, is sent along to a receiving unit such as storage tank or transport wagon or for feed usage for offspring after the milked animals.

26. The method according to claim 17, wherein the domestic animals comprise cows, sheep or goats.

27. A method for killing a bacteria, comprising:
   setting a food or drink on the process equipment according to claim 1; and
   sterilizing the food or drink by the process equipment,
   wherein the food or drink is a juice, a hospital sewage, soups or sauces.

* * * * *